United States Patent
Hua et al.

(10) Patent No.: US 12,341,921 B2
(45) Date of Patent: Jun. 24, 2025

(54) DISPLAY METHOD AND ELECTRONIC DEVICE

(71) Applicant: HUAWEI TECHNOLOGIES CO., LTD., Guangdong (CN)

(72) Inventors: Mengzheng Hua, Wuhan (CN); Gang Li, Wuhan (CN); Xiaofei Zhong, Wuhan (CN); Cheng Luo, Wuhan (CN); Xiong Shen, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/249,802

(22) PCT Filed: Aug. 31, 2021

(86) PCT No.: PCT/CN2021/115675
§ 371 (c)(1),
(2) Date: Apr. 20, 2023

(87) PCT Pub. No.: WO2022/083296
PCT Pub. Date: Apr. 28, 2022

(65) Prior Publication Data
US 2023/0388405 A1 Nov. 30, 2023

(30) Foreign Application Priority Data
Oct. 22, 2020 (CN) .......................... 202011141940.4

(51) Int. Cl.
*H04M 1/72412* (2021.01)
*G06F 3/14* (2006.01)
*H04M 1/72427* (2021.01)

(52) U.S. Cl.
CPC ...... *H04M 1/72412* (2021.01); *G06F 3/1454* (2013.01); *H04M 1/72427* (2021.01)

(58) Field of Classification Search
CPC ......... H04M 1/72412; H04M 1/72427; H04M 1/72454; H04M 1/72469; H04M 1/72448;
(Continued)

(56) References Cited

U.S. PATENT DOCUMENTS

| 2012/0050613 A1 | 3/2012 | Halna Du Fretay et al. |
| 2014/0089847 A1 | 3/2014 | Seo et al. |

(Continued)

FOREIGN PATENT DOCUMENTS

| CN | 105991962 A | 10/2016 |
| CN | 107220019 A | 9/2017 |

(Continued)

OTHER PUBLICATIONS

Office Action in Japanese Appln. No. 2023-524817, mailed on May 20, 2024, 5 pages (with English translation).

(Continued)

*Primary Examiner* — Farid Seyedvosoghi
(74) *Attorney, Agent, or Firm* — Fish & Richardson P.C.

(57) ABSTRACT

In an example method, a first device establishes a connection for multi-screen collaboration to a second device. The first device turns off a screen in response to a first event. The first device draws screen content based on a first software signal in response to a second event, to obtain a screen content drawing result. Then, the first device synthesizes the screen content drawing result based on a second software signal, to obtain a screen content synthesis result. The first software signal and the second software signal are software synchronization signals that are generated by a same software signal source in the first device and that have a same cycle. Finally, the first device sends the screen content synthesis result to the second device.

20 Claims, 17 Drawing Sheets

(58) Field of Classification Search
CPC ....... G06F 3/1454; G06F 3/1438; G09G 5/12; G09G 5/397; G09G 5/18; G09G 2330/027; G09G 2340/12; Y02D 30/70
See application file for complete search history.

(56) References Cited

U.S. PATENT DOCUMENTS

| | | | |
|---|---|---|---|
| 2015/0082058 A1 | 3/2015 | Hahm et al. | |
| 2016/0188279 A1 | 6/2016 | Rajamani et al. | |
| 2017/0139661 A1* | 5/2017 | Veeramani | G06F 3/03543 |
| 2017/0160882 A1 | 6/2017 | Park et al. | |
| 2018/0025697 A1* | 1/2018 | Bae | G06F 3/1454 |
| | | | 345/592 |
| 2018/0285051 A1 | 10/2018 | Cawley | |
| 2018/0286344 A1 | 10/2018 | Yang et al. | |
| 2019/0206367 A1 | 7/2019 | Kim et al. | |
| 2020/0043216 A1 | 2/2020 | O'Brien | |

FOREIGN PATENT DOCUMENTS

| | | | |
|---|---|---|---|
| CN | 107231489 A | | 10/2017 |
| CN | 108702414 A | | 10/2018 |
| CN | 109753262 A | | 5/2019 |
| CN | 109783043 A | | 5/2019 |
| CN | 109992232 A | | 7/2019 |
| CN | 110503708 A | | 11/2019 |
| CN | 110515576 A | | 11/2019 |
| CN | 111107518 A | | 5/2020 |
| CN | 210515265 U | | 5/2020 |
| JP | 2014215318 A | * | 11/2014 |
| JP | 2020042592 A | | 3/2020 |

OTHER PUBLICATIONS

[No Author Listed][Online] "Mirror Your Android Display to Chromecast with the Screen Off to Save Battery [How-To]," Aug. 15, 2014, retrieved on Feb. 8, 2024, retrieved from URL <https://www.youube.com/watch?v=5alPnnqbx7l>, 2 pages.

Extended European Search Report in European Appln. No. 21881715.3, mailed on Feb. 23, 2024, 8 pages.

* cited by examiner

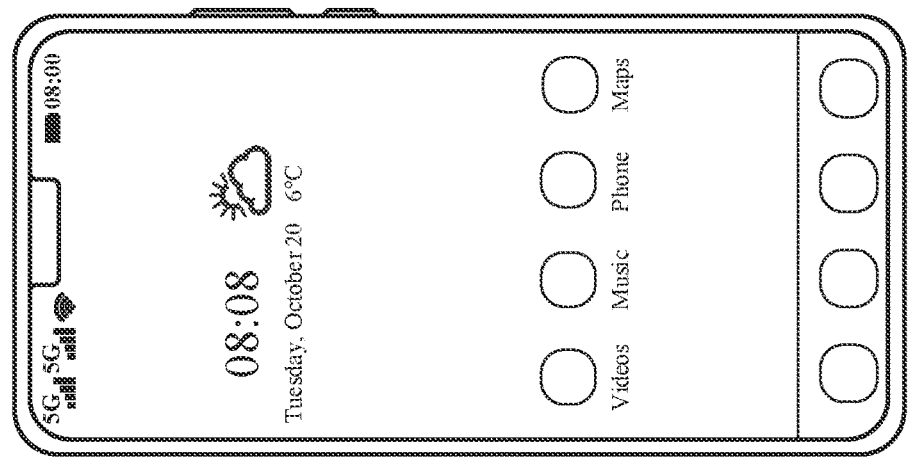
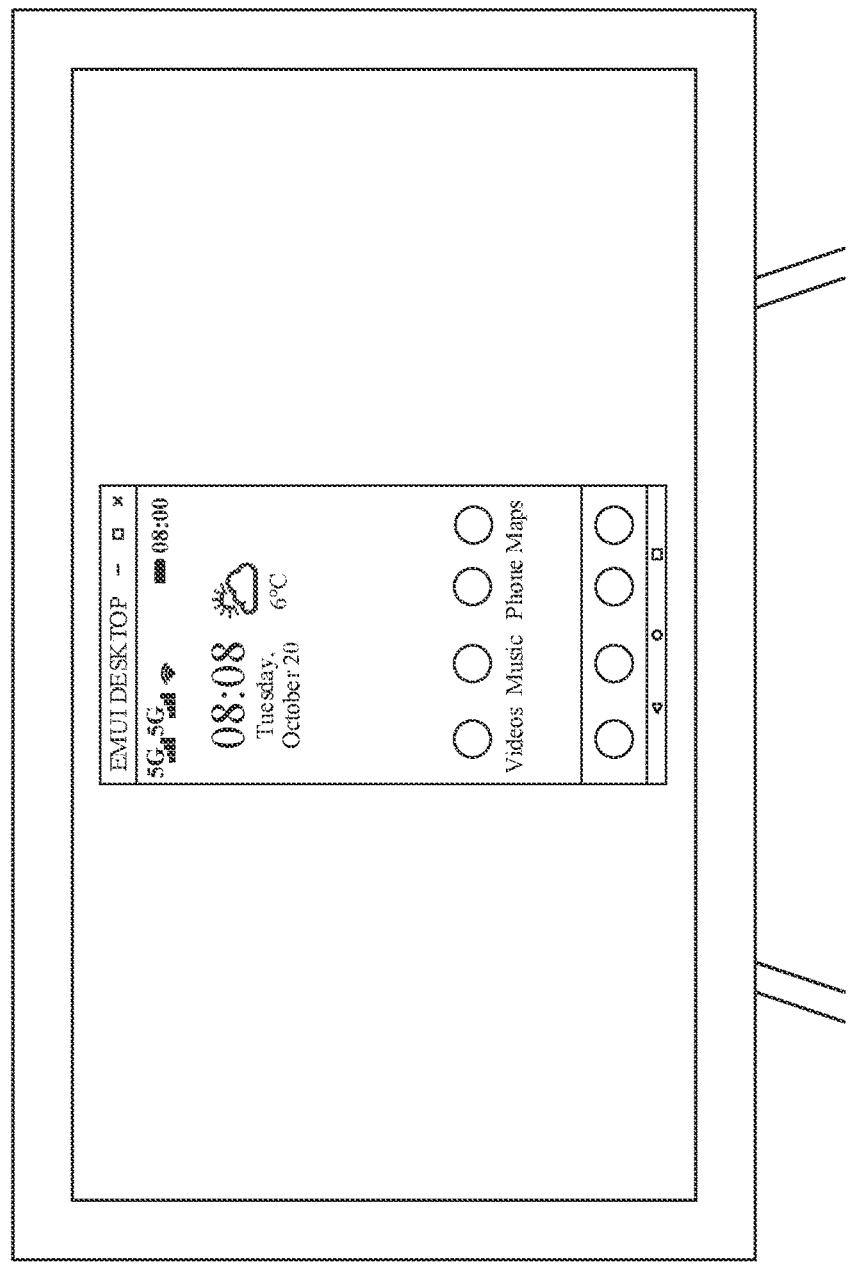
FIG. 1B

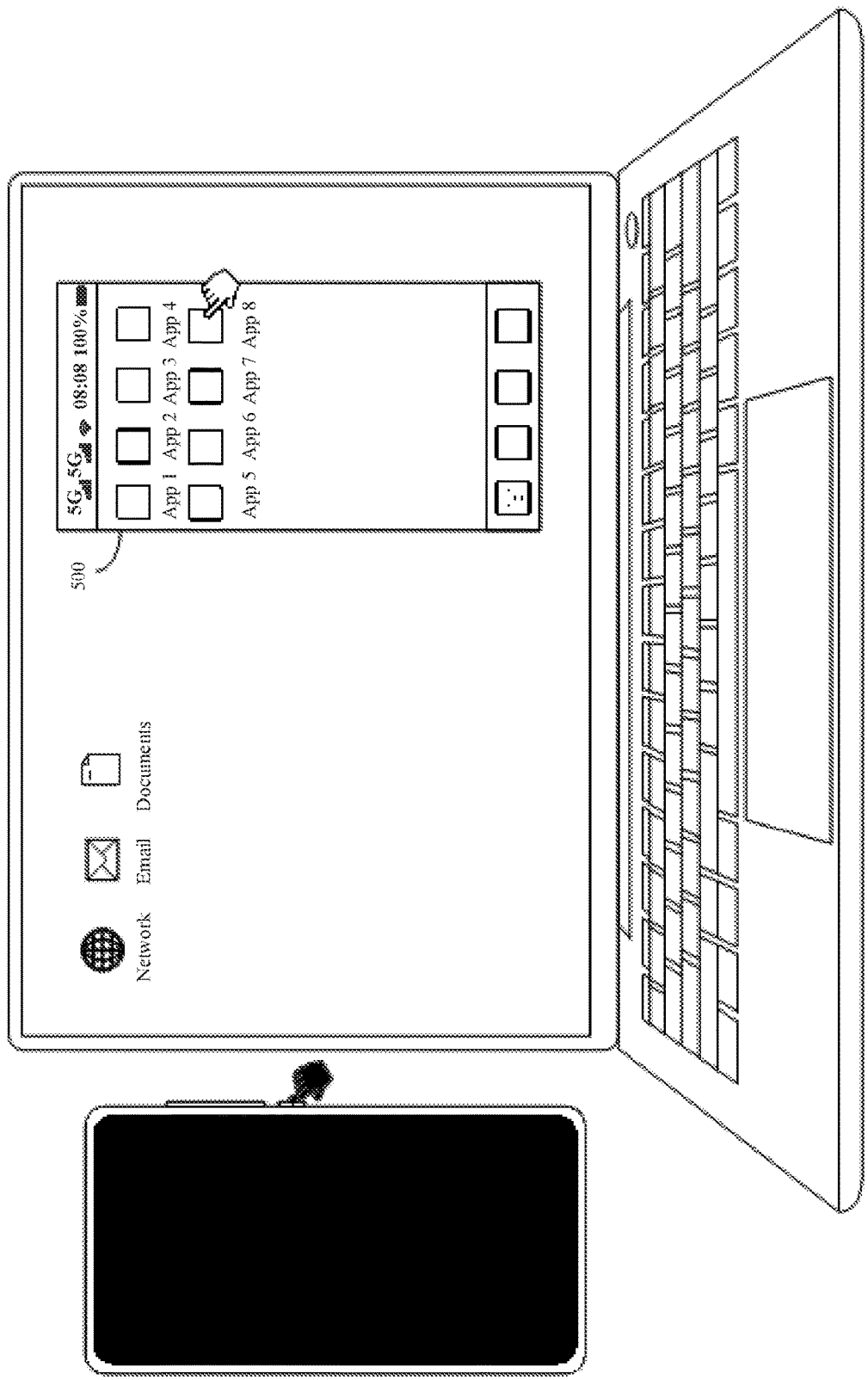

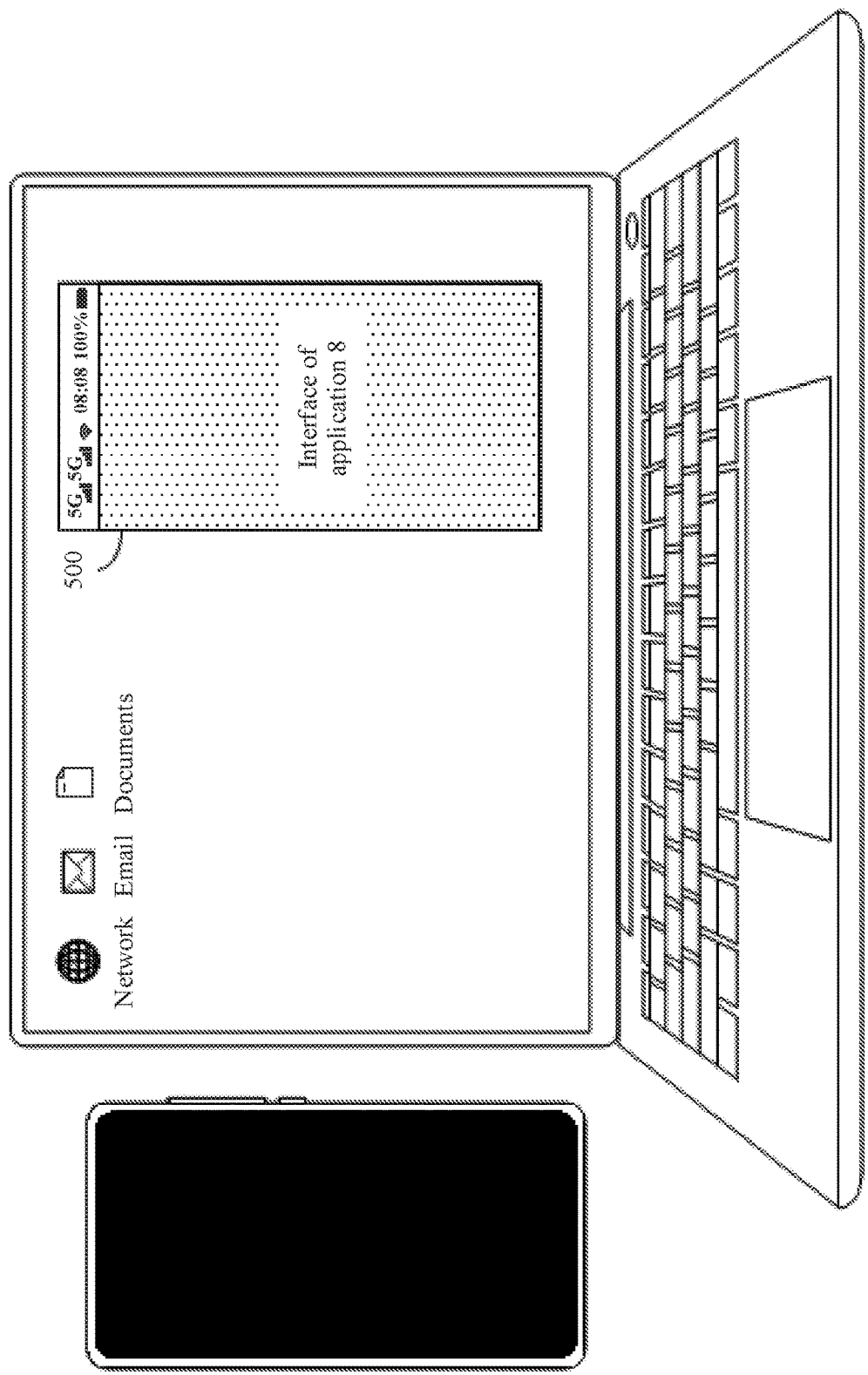

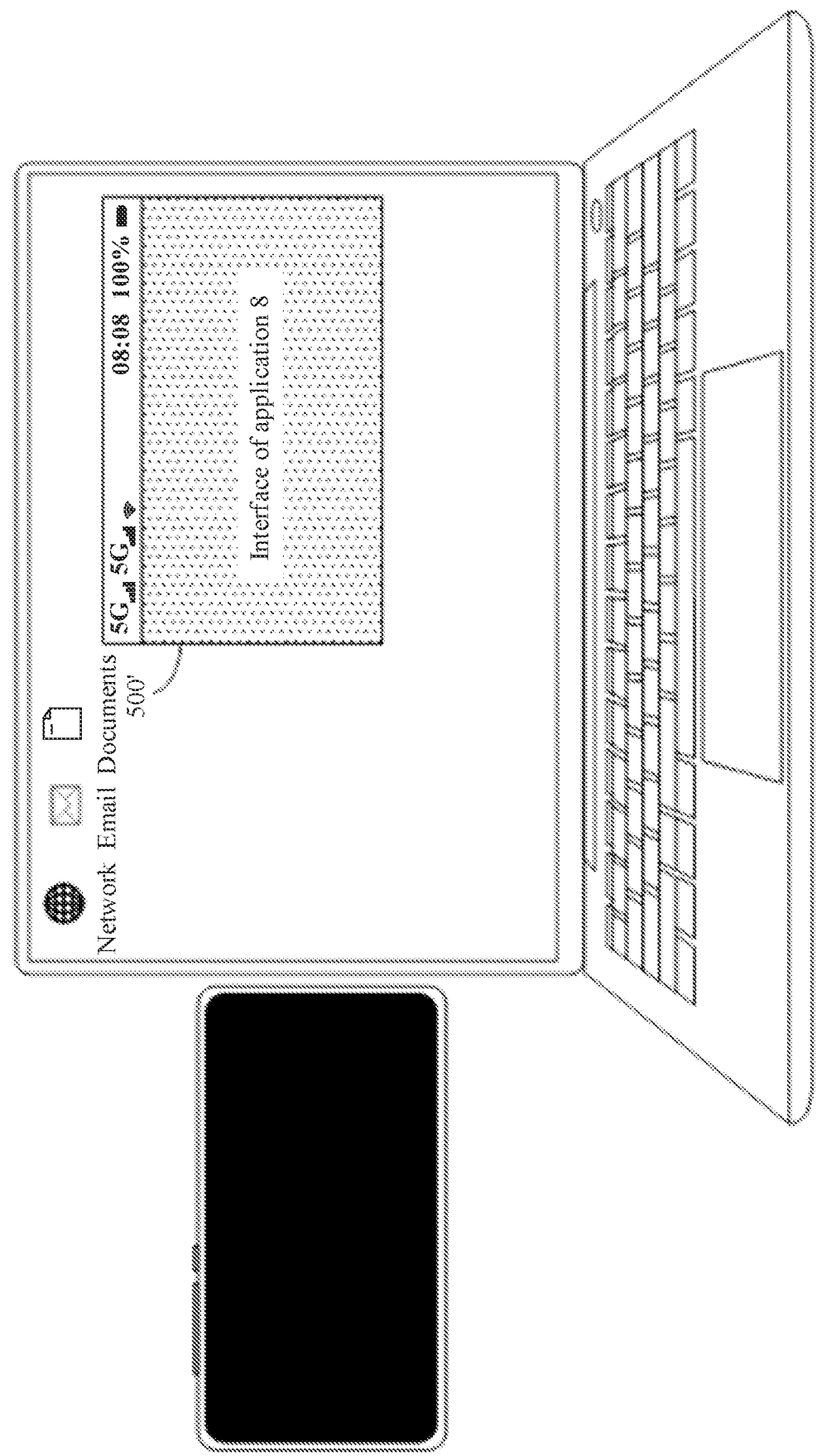

TO FIG. 8B

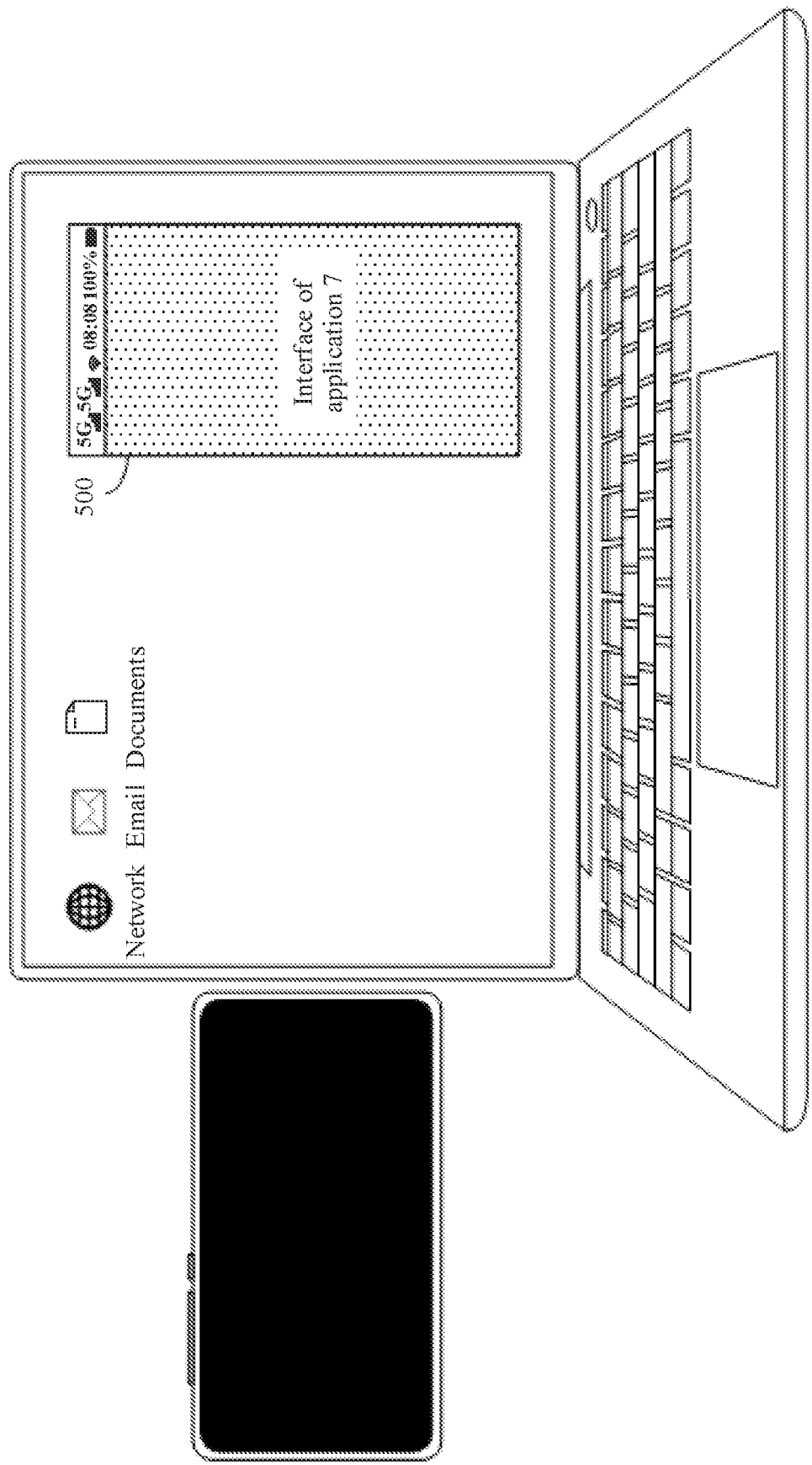

DISPLAY METHOD AND ELECTRONIC DEVICE

CROSS-REFERENCE TO RELATED APPLICATIONS

This application is a National Stage of International Application No. PCT/CN2021/115675, filed on Aug. 31, 2021, which claims priority to Chinese Patent Application No. 202011141940.4, filed on Oct. 22, 2020. Both of the aforementioned applications are hereby incorporated by reference in their entireties.

TECHNICAL FIELD

This application relates to the field of electronic device display technologies, and in particular, to a display method and an electronic device.

BACKGROUND

Currently, electronic devices (such as mobile phones, tablet computers, notebook computers, and smart screens) support multi-screen collaboration. Through multi-screen collaboration, screen content of an electronic device A may be projected to an electronic device B in a wired or wireless manner for display, and after projection, a change of the screen content of the electronic device A may be synchronously displayed on the electronic device B. In addition, a user may further perform, on the electronic device B, an operation on the screen content projected by the electronic device A, so that the electronic device A displays corresponding screen content in response to the operation on the electronic device B. For example, the user may project, through multi-screen collaboration, screen content of a mobile phone to a notebook computer, so that the user can use a screen of the notebook computer to view both screen content of the notebook computer and the screen content of the mobile phone, and does not need to pay attention to screens of the two electronic devices, which is convenient for the user to use.

Usually, screen content of an electronic device is drawn based on a drawing synchronization signal, and then is synthesized based on a synthetic synchronization signal. The drawing synchronization signal and the synthetic synchronization signal are two software signals. When the electronic device is in a screen-on state, the drawing synchronization signal and the synthetic synchronization signal are two software signals that have a same cycle and that are generated by one software signal source. When a difference between a cycle of the drawing synchronization signal and an expected value and a difference between a cycle of the synthetic synchronization signal and an expected value are excessively large, the electronic device may generate a hardware signal by using a hardware signal source, to correspondingly adjust the cycles of the drawing synchronization signal and the synthetic synchronization signal that are generated by the software signal source, to reduce the differences between the cycles and the expected values, and improve screen display smoothness. However, when the electronic device is in a screen-off state, the hardware signal source is turned off, and SyntheticVSync is used as the drawing synchronization signal, to reduce power consumption. In this case, if the electronic device serves as a screen content projection party in a multi-screen collaboration scenario, frame freezing or frame loss may easily occur to displaying of the screen content of the electronic device, affecting viewing of the user.

SUMMARY

Embodiments of this application provide a display method, so that when an electronic device is in a screen-off state and is in a multi-screen collaboration scenario, a software signal used for screen content synthesis and a software signal used for screen content drawing are generated by a same software signal source and have a same cycle. This helps reduce a possibility of frame freezing or frame loss of screen content in the multi-screen collaboration scenario.

According to a first aspect, a display method is provided. The method specifically includes: A first device establishes a connection for multi-screen collaboration to a second device; the first device receives a first event, where the first event is used to trigger the first device to turn off a screen; the first device turns off the screen in response to the first event; the first device receives a second event, where the second event is used to trigger drawing and synthesis of screen content that is of the first device and that needs to be displayed on the second device; the first device draws the screen content based on a first software signal in response to the second event, to obtain a screen content drawing result; next, the first device synthesizes the screen content drawing result based on a second software signal, to obtain a screen content synthesis result, where the first software signal and the second software signal are software synchronization signals that are generated by a same software signal source in the first device and that have a same cycle; and finally, the first device sends the screen content synthesis result to the second device.

In this embodiment of this application, when the first device is in a screen-off state and in a multi-screen collaboration scenario, drawing is performed based on the first software signal, and synthesis is performed based on the second software signal. In addition, the first software signal and the second software signal are software signals that are generated by a same software signal source and that have a same cycle. Therefore, when the first device is in the screen-off state, this helps reduce a possibility of frame freezing of the screen content of the first device displayed on the second device.

In a possible design, the second event is an event generated by a user input back channel operation performed on the first device by a user on the second device.

Alternatively, the second event is an event generated when a type of the screen content that is of the first device and that needs to be displayed on the second device is an animation.

Alternatively, the second event is an event generated by an operation of rotating the screen of the first device from a landscape mode to a portrait mode by a user, or an event generated by an operation of rotating the screen of the first device from a portrait mode to a landscape mode by a user. When the first device detects the user input back channel operation, the type of the screen content being the animation, or screen rotation, drawing and synthesis are performed based on the foregoing method. This helps reduce the possibility of frame freezing of the screen content of the first device displayed on the second device.

In a possible design, after that the first device turns off the screen, the first device turns off a hardware signal source. The hardware signal source is used to generate a hardware signal for adjusting a cycle of the first software signal and a cycle of the second software signal. The foregoing technical solution helps reduce power consumption.

In a possible design, after that the first device turns off the screen, the first device keeps a hardware signal source in an on state. This technical solution helps adjust the cycle of the first software signal and the cycle of the second software signal based on the hardware signal source and further helps reduce the possibility of frame freezing of the screen content of the first device displayed on the second device.

In a possible design, when a difference between a cycle of the first software signal and an expected value is greater than or equal to a first threshold, and/or a difference between a cycle of the second software signal and the expected value is greater than or equal to the first threshold, the first device generates a hardware signal by using the hardware signal source, and adjusts the cycle of the first software signal and/or the cycle of the second software signal based on the hardware signal, so that a difference between a cycle of the first software signal and/or a cycle of the second software signal and the expected value is less than the first threshold. The hardware signal source enters a working state only when the difference between the cycle of the first software signal and the expected value is greater than or equal to the first threshold, and/or the difference between the cycle of the second software signal and the expected value is greater than or equal to the first threshold. Therefore, this helps reduce the possibility of frame freezing of the screen content of the first device displayed on the second device and reduce power consumption of an electronic device.

In a possible design, after the first device receives the second event, the first device determines that the first device is currently in a screen-off state and that the first device is in a multi-screen collaboration scenario, and then draws the screen content based on the first software signal. This helps reduce the possibility of frame freezing of the screen content of the first device displayed on the second device.

In a possible design, when a target counter is not 0, the first device determines that the first device is in a multi-screen collaboration scenario. The target counter is configured to record a quantity of devices that are configured to perform multi-screen collaboration with the first device. This helps simplify an implementation.

According to a second aspect, another display method is provided. The method specifically includes: A first device runs a first application, and receives a first event, where the first event is used to trigger the first device to turn off a screen; the first device turns off the screen in response to the first event; then, the first device receives a second event, where the second event is used to trigger drawing and synthesis of an interface of the first application; the first device draws the interface of the first application based on a first software signal in response to the second event, to obtain an interface drawing result; and the first device synthesizes the interface drawing result based on a second software signal, to obtain the interface of the first application, where the first software signal and the second software signal are software synchronization signals that are generated by a same software signal source in the first device and that have a same cycle.

In this embodiment of this application, when the first device is in a screen-off state, drawing is performed based on the first software signal, and synthesis is performed based on the second software signal. In addition, the first software signal and the second software signal are software signals that are generated by a same software signal source and that have a same cycle. Therefore, this helps reduce a frame loss rate when the first device is in the screen-off state.

In a possible design, the second event is an event generated by content whose type is animation and that is included in the interface of the first application.

Alternatively, the second event is an event generated by an operation of rotating the screen of the first device from a landscape mode to a portrait mode by a user, or an event generated by an operation of rotating the screen of the first device from a portrait mode to a landscape mode by a user.

In a possible design, after that the first device turns off the screen, the first device turns off a hardware signal source. The hardware signal source is used to generate a hardware signal for adjusting a cycle of the first software signal and a cycle of the second software signal. The foregoing technical solution helps reduce power consumption.

In a possible design, after that the first device turns off the screen, the first device keeps a hardware signal source in an on state. This technical solution helps adjust the cycle of the first software signal and the cycle of the second software signal based on the hardware signal source and further helps reduce the frame loss rate.

In a possible design, when a difference between a cycle of the first software signal and an expected value is greater than or equal to a first threshold, and/or a difference between a cycle of the second software signal and the expected value is greater than or equal to the first threshold, the first device generates a hardware signal by using the hardware signal source, and adjusts the cycle of the first software signal and/or the cycle of the second software signal based on the hardware signal, so that a difference between a cycle of the first software signal and/or a cycle of the second software signal and the expected value is less than the first threshold. The hardware signal source enters a working state only when the difference between the cycle of the first software signal and the expected value is greater than or equal to the first threshold, and/or the difference between the cycle of the second software signal and the expected value is greater than or equal to the first threshold. Therefore, this helps reduce the frame loss rate and reduce power consumption of an electronic device.

According to a third aspect, an electronic device is provided, including at least one processor, at least one memory, a display, and a transceiver. The one or more memories store one or more computer programs, the one or more computer programs include instructions, and when the instructions are executed by the one or more processors, the electronic device is enabled to perform the following steps:
establishing, with a second device, a connection for multi-screen collaboration;
receiving a first event, where the first event is used to trigger the electronic device to turn off a screen;
turning off the screen in response to the first event;
receiving a second event, where the second event is used to trigger drawing and synthesis of screen content that is of the electronic device and that needs to be displayed on the second device;
drawing the screen content based on a first software signal in response to the second event, to obtain a screen content drawing result;
synthesizing the screen content drawing result based on a second software signal, to obtain a screen content synthesis result, where the first software signal and the second software signal are software synchronization signals that are generated by a same software signal source in the electronic device and that have a same cycle; and sending the screen content synthesis result to the second device.

In a possible design, the second event is an event generated by a user input back channel operation performed on the electronic device by a user on the second device.

Alternatively, the second event is an event generated when a type of the screen content that is of the electronic device and that needs to be displayed on the second device is an animation.

Alternatively, the second event is an event generated by an operation of rotating the display of the electronic device from a landscape mode to a portrait mode by a user, or an event generated by an operation of rotating the display of the first device from a portrait mode to a landscape mode by a user.

In a possible design, when the instructions are executed by the one or more processors, after the electronic device turns off the screen, the electronic device is enabled to further perform the following step:

turning off a hardware signal source, where the hardware signal source is used to generate a hardware signal for adjusting a cycle of the first software signal and a cycle of the second software signal.

In a possible design, when the instructions are executed by the one or more processors, after the electronic device turns off the screen, the electronic device is enabled to further perform the following step:

keeping a hardware signal source in an on state.

In a possible design, when the instructions are executed by the one or more processors, the electronic device is enabled to further perform the following step:

when a difference between a cycle of the first software signal and an expected value is greater than or equal to a first threshold, and/or a difference between a cycle of the second software signal and the expected value is greater than or equal to the first threshold, generating a hardware signal by using the hardware signal source, and adjusting the cycle of the first software signal and/or the cycle of the second software signal based on the hardware signal, so that a difference between a cycle of the first software signal and/or a cycle of the second software signal and the expected value is less than the first threshold.

In a possible design, when the instructions are executed by the one or more processors, after the electronic device receives the second event and before the electronic device draws the screen content based on the first software signal, the electronic device is enabled to further perform the following step:

determining that the electronic device is currently in a screen-off state and that the electronic device is in a multi-screen collaboration scenario.

In a possible design, when the instructions are executed by the one or more processors, the electronic device is enabled to further perform the following step:

when the target counter is not 0, determining that the electronic device is in a multi-screen collaboration scenario.

In a possible design, the electronic device is a mobile phone, a tablet computer, a wearable device, a notebook computer, or the like.

According to a fourth aspect, another electronic device is provided, including at least one processor, at least one memory, and a display. The one or more memories store one or more computer programs, the one or more computer programs include instructions, and when the instructions are executed by the one or more processors, the electronic device is enabled to perform the following steps:

running a first application, and receiving a first event, where the first event is used to trigger the first device to turn off a screen; turning off the screen in response to the first event; then, receiving a second event, where the second event is used to trigger drawing and synthesis of an interface of the first application; drawing the interface of the first application based on a first software signal in response to the second event, to obtain an interface drawing result; and synthesizing the interface drawing result based on a second software signal, to obtain the interface of the first application, where the first software signal and the second software signal are software synchronization signals that are generated by a same software signal source in the first device and that have a same cycle.

In a possible design, the second event is an event generated by content whose type is animation and that is included in the interface of the first application.

Alternatively, the second event is an event generated by an operation of rotating the display of the electronic device from a landscape mode to a portrait mode by a user, or an event generated by an operation of rotating the display of the electronic device from a portrait mode to a landscape mode by a user.

In a possible design, when the instructions are executed by the one or more processors, after the electronic device turns off the screen, the electronic device is enabled to further perform the following step: turning off a hardware signal source. The hardware signal source is used to generate a hardware signal for adjusting a cycle of the first software signal and a cycle of the second software signal.

In a possible design, when the instructions are executed by the one or more processors, after the electronic device turns off the screen, the electronic device is enabled to further perform the following step: keeping a hardware signal source in an on state.

In a possible design, when the instructions are executed by the one or more processors, the electronic device is enabled to further perform the following step:

when a difference between a cycle of the first software signal and an expected value is greater than or equal to a first threshold, and/or a difference between a cycle of the second software signal and the expected value is greater than or equal to the first threshold, generating a hardware signal by using the hardware signal source, and adjusting the cycle of the first software signal and/or the cycle of the second software signal based on the hardware signal, so that a difference between a cycle of the first software signal and/or a cycle of the second software signal and the expected value is less than the first threshold.

According to a fifth aspect, another electronic device is provided. The electronic device includes modules/units that are configured to perform the method according to any one of the first aspect and the possible designs of the first aspect, or modules/units that are configured to perform the method according to any one of the second aspect and the possible designs of the second aspect. These modules/units may be implemented by hardware, or may be implemented by hardware by executing corresponding software.

According to a sixth aspect, a chip is provided. The chip is coupled to a memory in an electronic device, and is configured to invoke a computer program stored in the memory and perform, in embodiments of this application, the technical solution according to any one of the first aspect and the possible designs of the first aspect, or the technical solution according to any one of the second aspect and the possible designs of the second aspect. In embodiments of this application, "coupling" means that two components are directly or indirectly connected to each other.

According to a seventh aspect, a computer-readable storage medium is provided. The computer-readable storage medium includes a computer program. When the computer program is run on an electronic device, the electronic device is enabled to perform the technical solution according to any one of the first aspect and the possible designs of the first aspect, or the technical solution according to any one of the second aspect and the possible designs of the second aspect.

According to an eighth aspect, a computer program is provided. The computer program includes instructions, and when the instructions are run on a computer, the computer is enabled to perform the technical solution according to any one of the first aspect and the possible designs of the first aspect, or the technical solution according to any one of the second aspect and the possible designs of the second aspect.

According to a ninth aspect, a graphical user interface on an electronic device is provided. The electronic device has a display, one or more memories, and one or more processors. The one or more processors are configured to execute one or more computer programs stored in the one or more memories. The graphical user interface includes a graphical user interface displayed when the electronic device performs the technical solution according to any one of the first aspect and the possible designs of the first aspect, or a technical solution according to any one of the second aspect and the possible designs of the second aspect.

For beneficial effects of the third aspect to the ninth aspect, refer to beneficial effects of the first aspect. Details are not described again.

BRIEF DESCRIPTION OF DRAWINGS

FIG. 1B is a schematic diagram of another multi-screen collaboration scenario according to an embodiment of this application;

FIG. 5A and FIG. 5B are a schematic diagram of an application scenario according to an embodiment of this application;

FIG. 7A and FIG. 7B are a schematic diagram of another application scenario according to an embodiment of this application;

FIG. 8A and FIG. 8B are a schematic diagram of still another application scenario according to an embodiment of this application;

DESCRIPTION OF EMBODIMENTS

Some terms in embodiments of this application are explained first, to facilitate understanding of a person skilled in the art.

1. Projection: Projection means that an electronic device may project screen content of the electronic device to a screen of another electronic device in a wired or wireless manner for display. For ease of description, the electronic device that projects the screen content is referred to as a source end device, and the another electronic device to which the screen content is projected is referred to as a target device. Further, the screen content that is of the source end device and that is displayed on the target device may be synchronized with the screen content of the source end device. In other words, in this case, if the screen content of the source end device changes, the screen content that is of the source end device and that is displayed on the target device changes accordingly.

2. User input back channel: A user input back channel means that after a source end device projects screen content of the source end device to a target device for display, a user may control the source end device by operating screen content that is of the source end device and that is displayed on the target device.

Figure 1A:
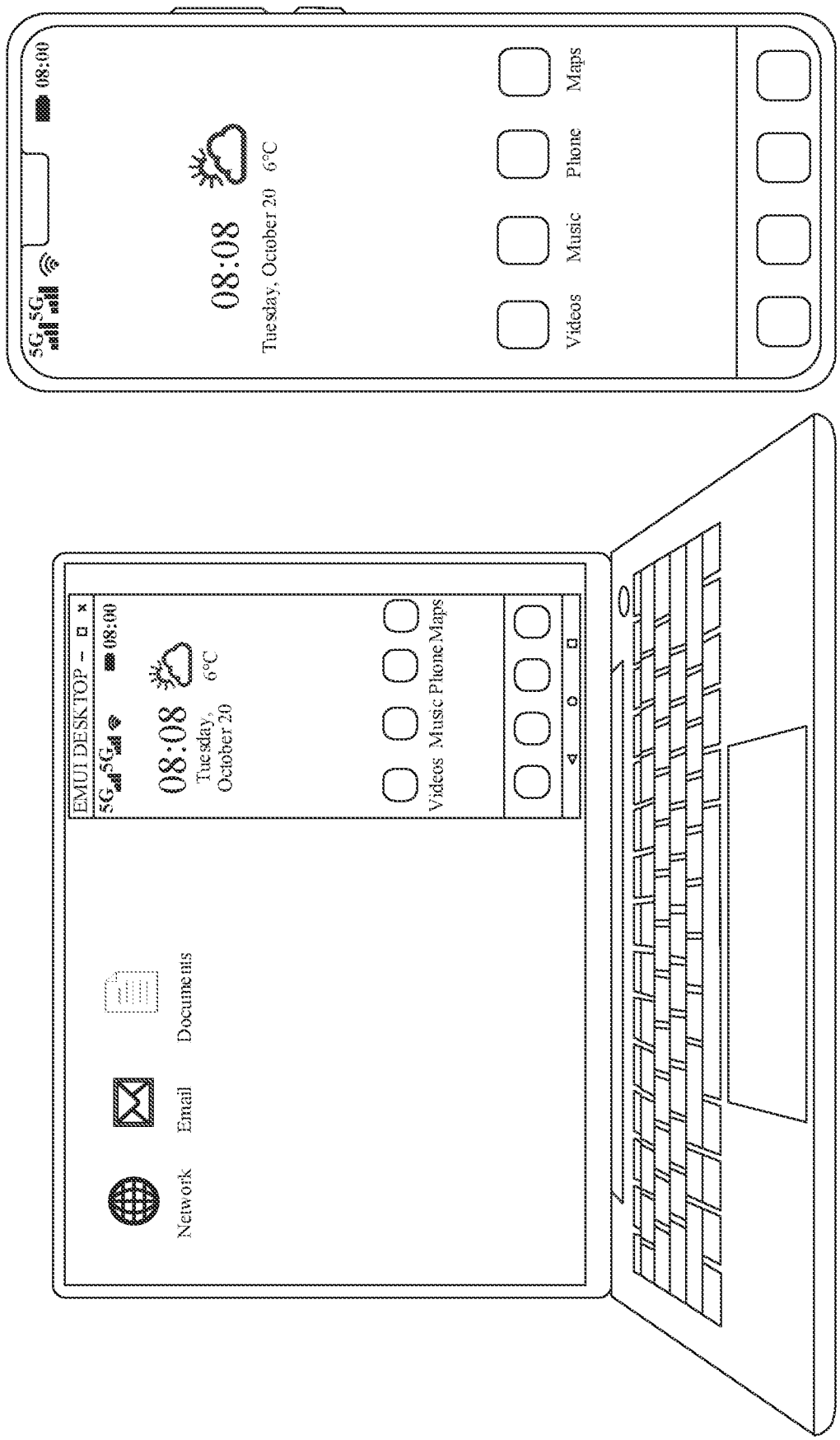
FIG. 1A is a schematic diagram of a multi-screen collaboration scenario according to an embodiment of this application.

3. Multi-screen collaboration: Multi-screen collaboration is a type of projection, which allows a source end device to project screen content of the source end device to one or more target devices. In addition, a user can perform an operation on the target device to implement a user input back channel on the source end device. For ease of description, the operation to implement the user input back channel on the source end device is referred to as a user input back channel operation in the following. For example, when a mobile phone serves as the source end device and a smart screen serves as the target device, the mobile phone may project screen content of the mobile phone to the smart screen, so that the user can view the screen content of the mobile phone on the smart screen, and control, by performing an operation on the smart screen, the mobile phone to display corresponding screen content, and the screen content that is of the mobile phone and that is displayed on the smart screen also changes accordingly. In addition, in some embodiments, projection of the source end device does not affect use of the target device by the user. For example, the target device may alternatively display screen content of the target device while displaying the screen content of the source end device. For example, when a mobile phone serves as the source end device and a notebook computer serves as the target device, the mobile phone projects screen content of the mobile phone to the notebook computer. The notebook computer may pop up a window used to display the screen content of the mobile phone. As shown in FIG. 7A, the user may perform a user input back channel on the mobile phone in the window that is used to display the screen content of the mobile phone on the notebook computer, and this does not affect use of the notebook computer by the user. For example, a position of the window that is used to display the screen content of the mobile phone on the notebook computer is movable. Alternatively, in some embodiments, the target device may serve as an external display of the source end device, and after the screen content of the source end device is projected to the target device, the user cannot use the target device. For example, when a mobile phone serves as the source end device and a television serves as the target device, the mobile phone may project screen content of the mobile phone to the television for display, so that the user can view the screen content of the mobile phone on the television, but the user cannot watch program content of the television. As shown in FIG. 1B, in this case, the television may be considered as an external display of the mobile phone. For example, the television may display, in full screen, the screen content projected by the mobile phone to the television, or may display, in a part of an area of a screen of the television, the screen content projected by the mobile phone, which is not limited herein.

Figure 1C:
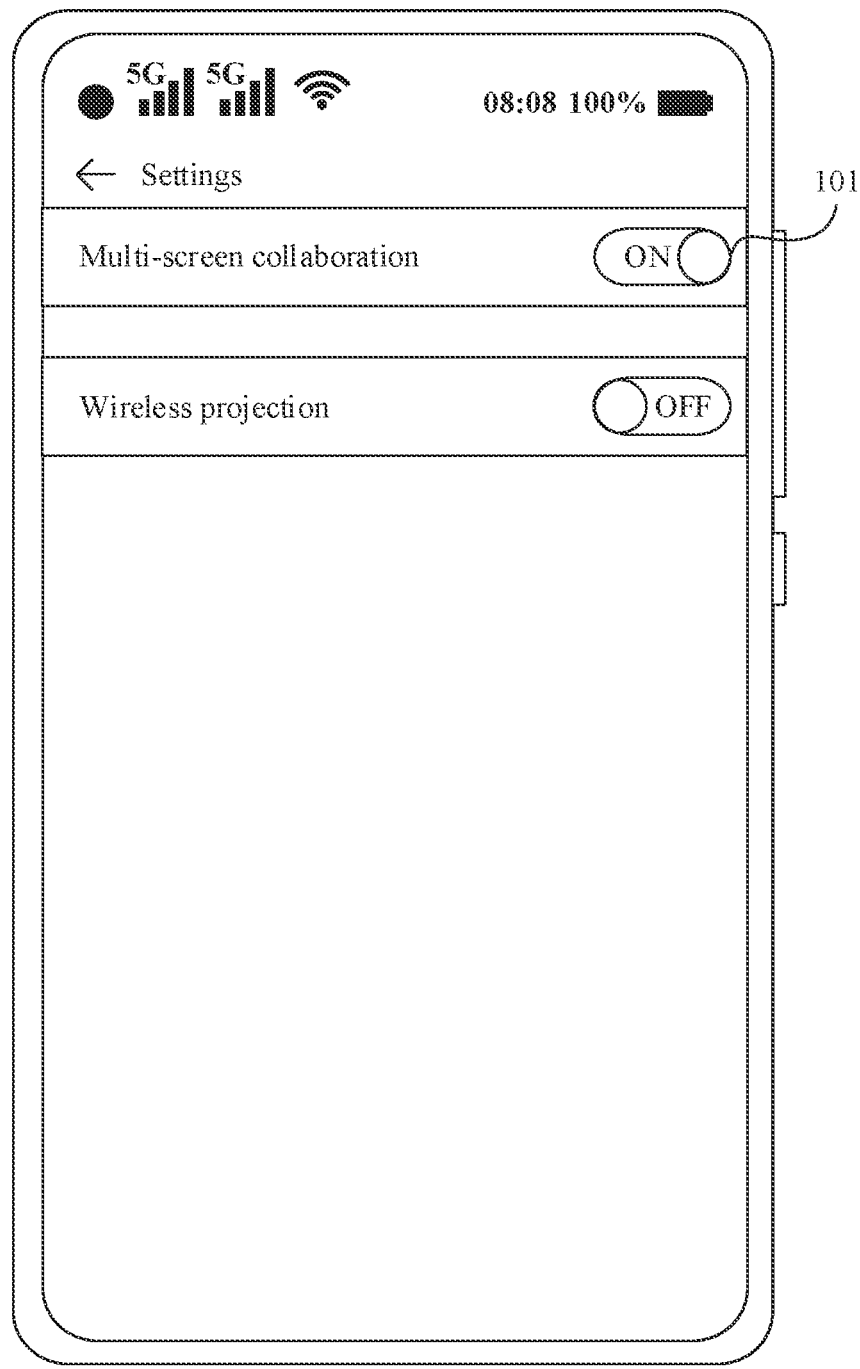
FIG. 1C is a schematic diagram of an interface according to an embodiment of this application.
Figure 1D:
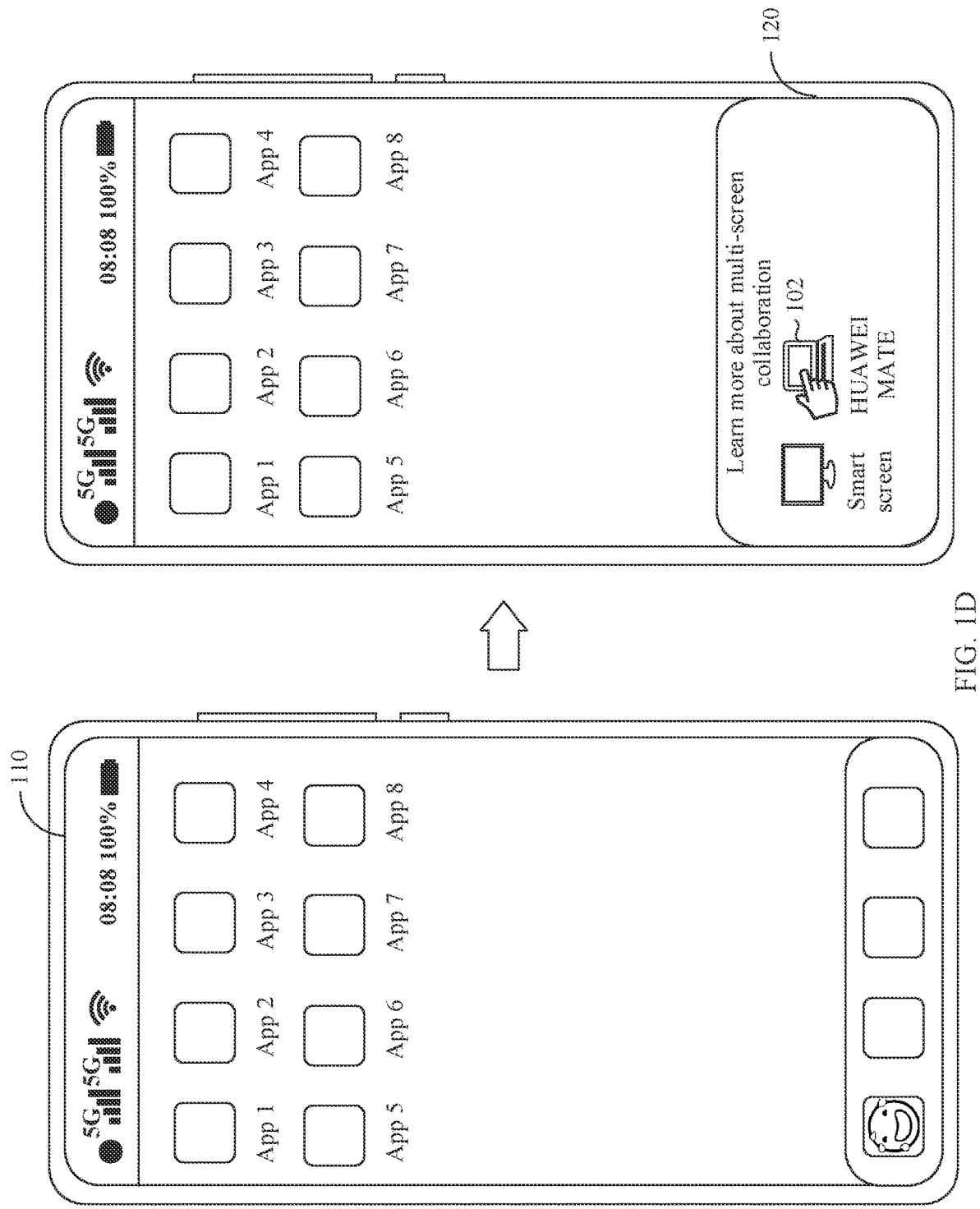
FIG. 1D is a schematic diagram of another interface according to an embodiment of this application.

A manner of implementing multi-screen collaboration is described by using a mobile phone as an example. For example, FIG. 1C is a schematic diagram of a system setting interface displayed by the mobile phone, where a control 101 configured to control enabling or disabling of a multi-screen collaboration function is included. A user may operate the control 101, so that when the control 101 is in an on (ON) state, the multi-screen collaboration function of the mobile phone is in an enabled state. When the control 101 is in an off (OFF) state, the multi-screen collaboration function of the mobile phone is in a disabled state. When the multi-screen collaboration function of the mobile phone is in the enabled state, and the mobile phone displays an interface, the interface displayed by the mobile phone is, for example, an interface 110 shown in FIG. 1D. The mobile phone displays a multi-device control center 120 in response to sliding upward along a lower boundary of a screen of the mobile phone by the user. As shown in FIG. 1D, the multi-device control center 120 includes an icon 102, and the icon 102 is used to indicate a notebook computer named HUAWEI MATE. In response to selecting the icon 102 by the user, the mobile phone initiates, to the notebook computer named HUAWEI MATE Book, establishment of a connection used for multi-screen collaboration. After the mobile phone and the notebook computer establish the connection used for multi-screen collaboration, the mobile phone may project screen content of the mobile phone to the notebook computer for display, to implement multi-screen collaboration.

It should be noted that the connection used for multi-screen collaboration between the mobile phone and the notebook computer may be a wired connection or a wireless connection. For example, the connection used for multi-screen collaboration between the mobile phone and the notebook computer is a Wi-Fi connection, and/or a Bluetooth connection, a connection by using a mobile network (for example, by using a 4G mobile network or a 5G mobile network), or the like. For another example, the mobile phone and the notebook computer are connected by using a data cable, to implement multi-screen collaboration. It should be noted that a protocol and a procedure for establishing the connection used for multi-screen collaboration between the mobile phone and the notebook computer are not limited in embodiments of this application.

4. Screen display status: In embodiments of this application, a screen display status includes a screen-on state and a screen-off state. When a screen display status of an electronic device is a screen-on state, that is, when the electronic device is in the screen-on state, a screen of the electronic device is on. When the screen display status of the electronic device is a screen-off state, that is, when the electronic device is in the screen-off state, the screen of the electronic device is off.

Figure 2A:
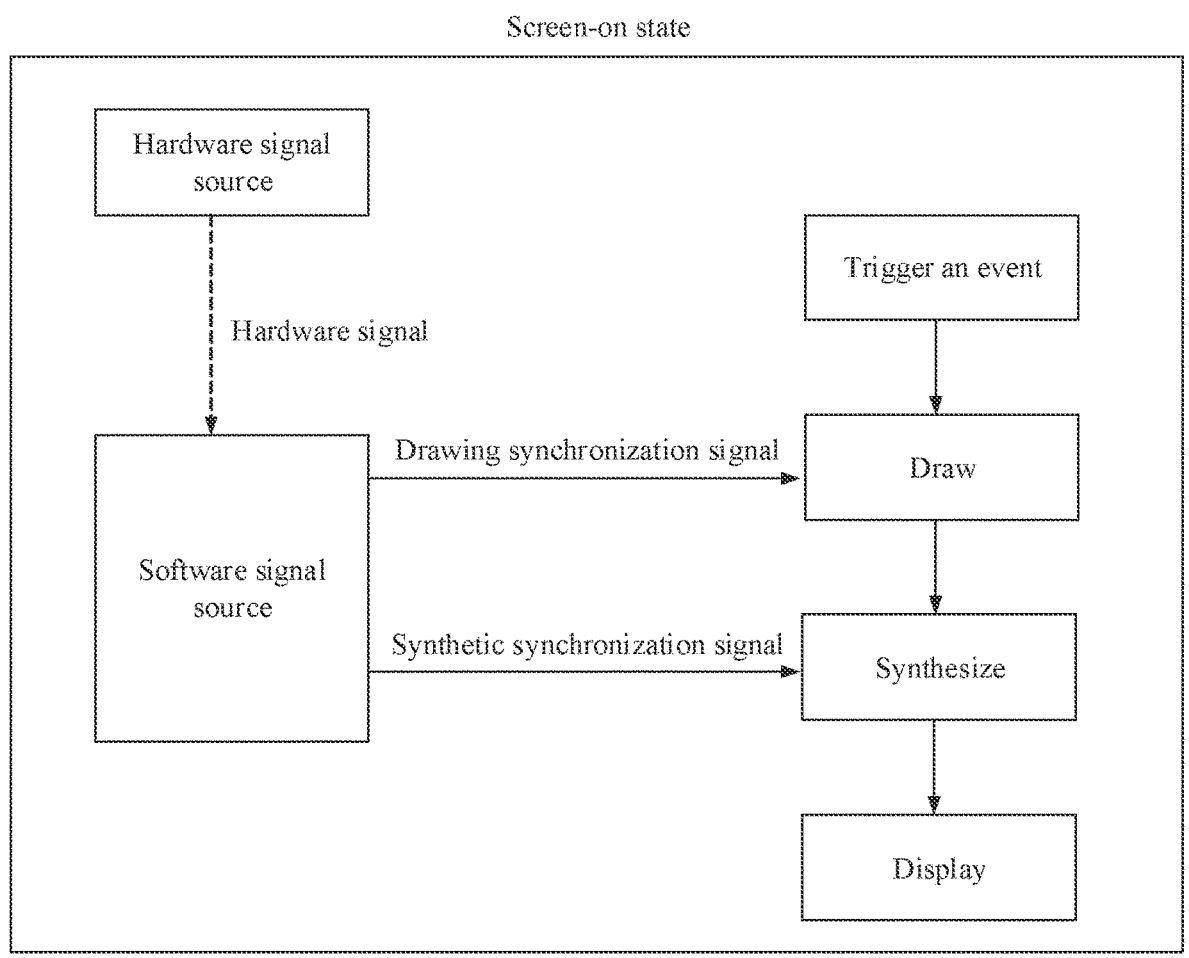
FIG. 2A is a schematic diagram of drawing and synthesizing screen content according to an embodiment of this application.

Usually, when the electronic device is in the screen-on state, screen content is obtained through synchronous rendering based on a VSync mechanism. Specifically, in the VSync mechanism, the electronic device draws and synthesizes the screen content rhythmically by using a hardware signal generated by a hardware signal source. However, in this manner, power consumption of the electronic device is prone to be relatively high. Therefore, on this basis, a software signal source is introduced. As shown in FIG. 2A, two software signals with a same cycle are generated by using the software signal source, and are respectively a drawing synchronization signal and a synthetic synchronization signal. The drawing synchronization signal is used to draw screen content, and the synthetic synchronization signal is used to synthesize the screen content. When a difference between a cycle of the drawing synchronization signal and an expected value (for example, 16.6 ms) and a difference between a cycle of the synthetic synchronization signal and the expected value are excessively large, the electronic device generates a hardware signal by using the hardware signal source, and correspondingly adjusts the cycles of the drawing synchronization signal and the synthetic synchronization signal that are generated by using the software signal source, to reduce the difference between the cycle of the drawing synchronization signal and the expected value and the difference between the cycle of the synthetic synchronization signal and the expected value, thereby improving screen display smoothness. It should be understood that the expected value may be defined by research and development personnel with reference to an actual situation of a device. Therefore, when the software signal source is introduced, the hardware signal source may generate a hardware signal only in some specific conditions, and does not need to be always in a working state. This helps reduce power consumption of the electronic device.

Figure 2B:
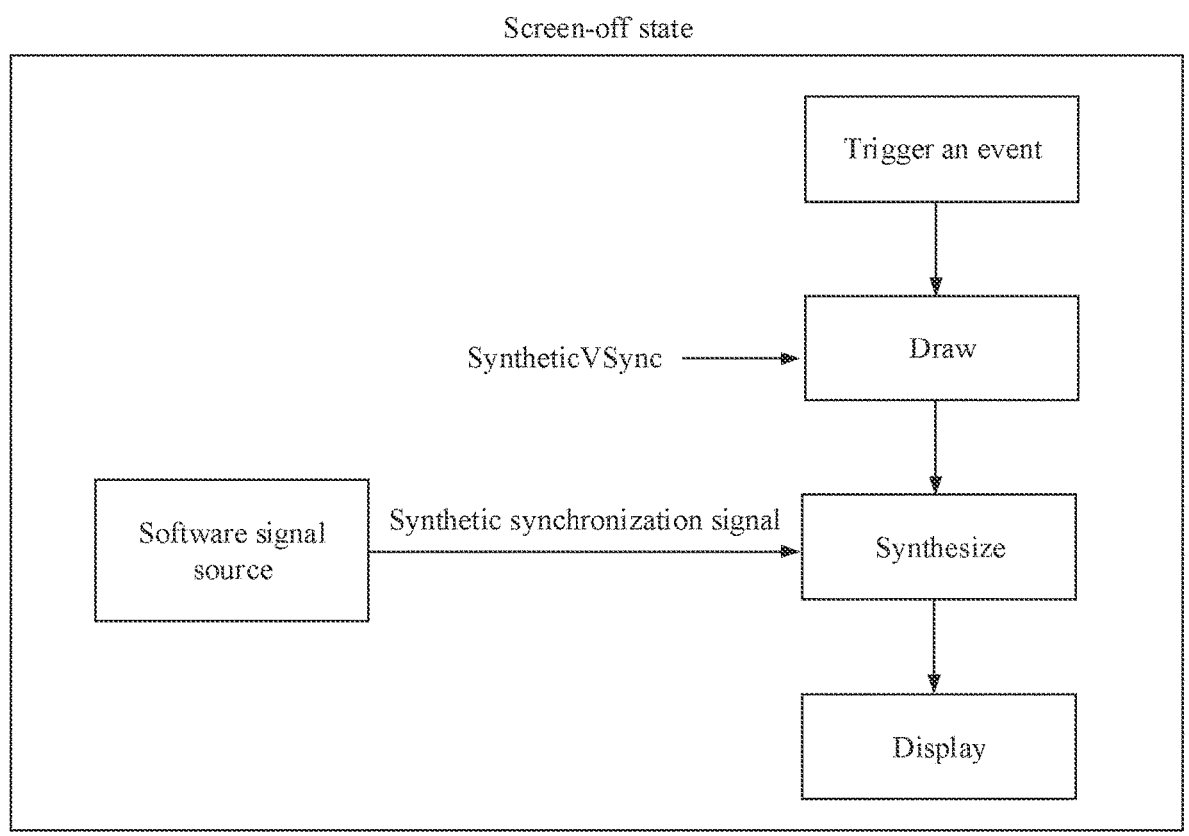
FIG. 2B is another schematic diagram of drawing and synthesizing screen content according to an embodiment of this application.

However, when the electronic device is in the screen-off state, the hardware signal source is always turned off, and the hardware signal cannot be generated. In addition, SyntheticVSync serves as the drawing synchronization signal, as shown in FIG. 2B, to reduce power consumption of the electronic device. However, SyntheticVSync is false synchronization, which is prone to cause a difference between the cycle of the drawing synchronization signal and the cycle of the synthetic synchronization signal. When the electronic device serves as a source end device in a multi-screen collaboration scenario, frame freezing of screen content of the source end device displayed on a target device is prone to be affected, and use of the user is affected.

In view of this, an embodiment of this application provides a display method, so that when an electronic device is in a screen-off state, a cycle of a signal used for screen content drawing synchronization and a cycle of a signal used for screen content synthesis synchronization are two same software signals. This helps reduce a possibility that screen content of a source end device displayed on a target device is abnormal when the electronic device serves as the source end device in a multi-screen collaboration scenario.

It should be understood that "at least one" in embodiments of this application means one or more, and "a plurality of" means two or more than two. The term "and/or" describes an association relationship for describing associated objects and represents that three relationships may exist. For example, A and/or B may represent the following three cases: Only A exists, both A and B exist, and only B exists. A and B may be in a singular form or a plural form. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may represent seven cases: a, b, c, a and b, a and c, b and c, and a, b and c. Each of a, b, and c may be an element, or may be a set including one or more elements.

In this application, "example", "in some embodiments", "in some other embodiments", or the like is used to represent giving an example, an illustration, or a description. Any embodiment or design solution described as an "example" in this application should not be explained as being more preferred or having more advantages than another embodiment or design solution. Specifically, the term "example" is used to present a concept in a specific manner.

It should be noted that, in embodiments of this application, the terms such as "first" and "second" are only used for a purpose of distinction in description, and should not be understood as an indication or implication of relative importance or an indication or implication of a sequence.

The term "event" means an external input or internal input detected by an electronic device. The term "event" may include an external input (for example, an input used to trigger screen content drawing and synthesis) detected by one or more sensors or switches of the electronic device and/or an internal input (for example, an input used to trigger the electronic device to turn off a screen because no operation is performed on the electronic device within a preset time) generated when a status change of the electronic device is detected inside a system of the electronic device. The external input included in the term "event" includes touch on a touch-sensitive surface, mouse click, keyboard input, screen rotation, and the like. One event includes one or more sub-events. The sub-event is usually a change of the event (for example, touch and press, touch and move, or touch and leave may be the sub-event). Sub-events in a sequence of one or more sub-events may be in many forms, including but not limited to: key press, key press and hold, key release, button press, button press and hold, button release, joystick movement, mouse movement, mouse button press, mouse button release, stylus touch, stylus movement, stylus release, a voice instruction, detected eye movement, a biometric input, a detected physiological change of a user, and the like. For example, a mobile phone and a notebook computer in a multi-screen collaboration scenario are used as an example, and an event may be an operation that is detected by a sensor in the notebook computer and that is of tapping, by a user on the notebook computer, screen content projected by the mobile phone. The internal input included in the term "event" includes an input that is generated when no operation is performed on the electronic device within a preset time and that is used to trigger the electronic device to turn off the screen, or an input that is generated when the electronic device detects that an application running in the foreground is playing a video or an animation.

An electronic device in embodiments of this application may be a portable terminal, for example, a mobile phone, a tablet computer, a notebook computer, or a wearable device (such as a smartwatch). In addition, the electronic device in embodiments of this application is, not limited to the portable terminal, for example, an in-vehicle terminal, a smart screen, a television, a desktop computer, or the like. For example, an operating system including, but not limited to, a HarmonyOS®, an IOS®, an Android®, a Windows®, or another operating system is installed on the electronic device in embodiments of this application.

Figure 3:
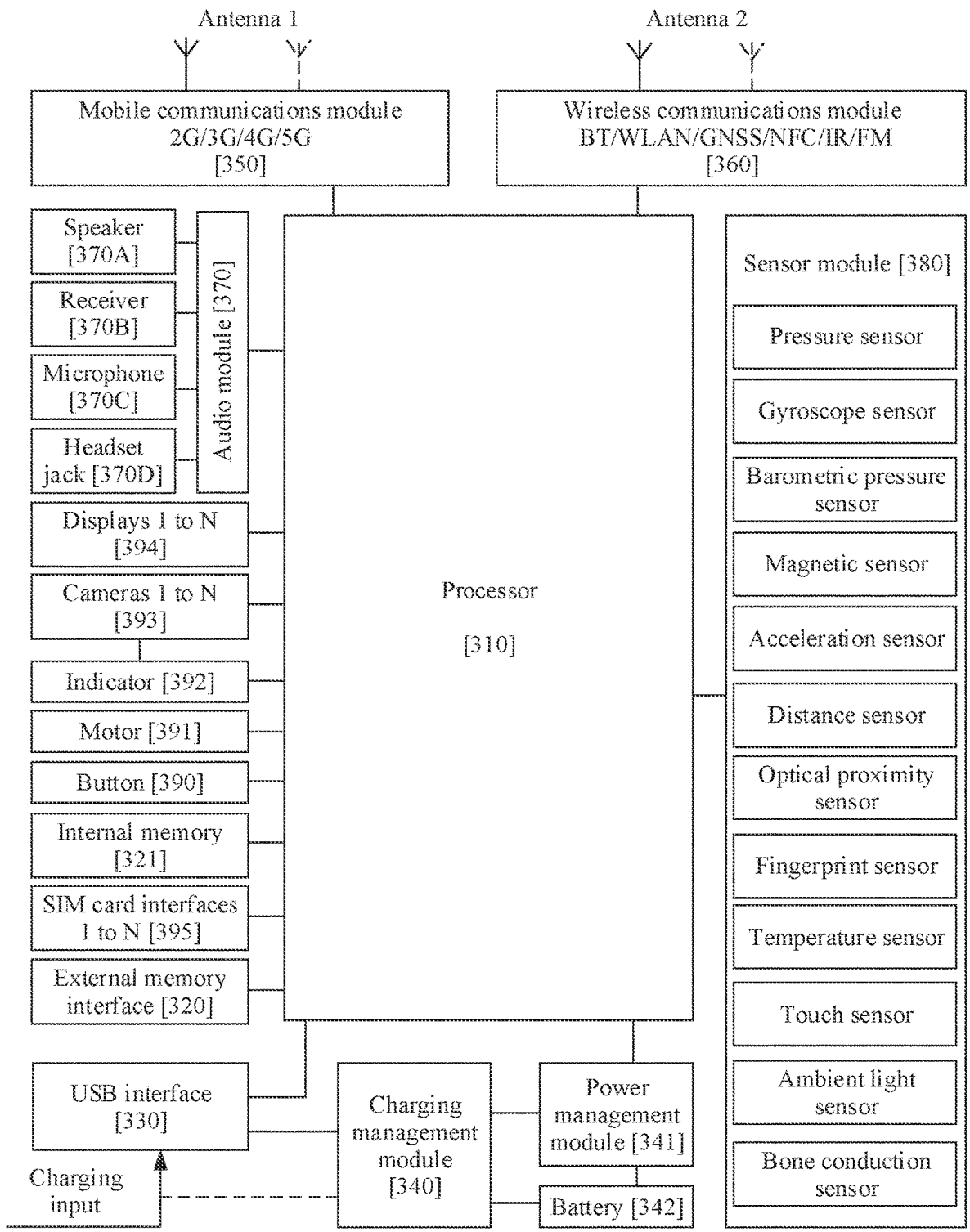
FIG. 3 is a schematic diagram of a hardware structure of a mobile phone according to an embodiment of this application.

That the electronic device is a mobile phone is used as an example. For example, FIG. 3 is a schematic diagram of a hardware structure of a mobile phone according to an embodiment of this application. Specifically, as shown in the figure, the mobile phone includes a processor 310, an external memory interface 320, an internal memory 321, a universal serial bus (USB) interface 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (SIM) card interface 395, and the like. The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The processor 310 may include one or more processing units. For example, the processor 310 may include an application processor (AP), a modem, a graphics processing unit (GPU), an image signal processor (ISP), a controller, a video codec, a digital signal processor (DSP), a baseband processor, a neural-network processing unit (NPU), and/or the like. Different processing units may be independent components, or two or more different processing units may be integrated into one component.

A memory may be further disposed in the processor 310, and is configured to store a computer program and/or data. In some embodiments, the memory in the processor 310 is a cache. The memory may store computer program and/or data just used or cyclically used by the processor 310. If the processor 310 needs to use the computer program and/or the data again, the processor may directly invoke the computer program and/or the data from the memory. This avoids repeated access and reduces waiting time of the processor 310, thereby improving system efficiency.

In some embodiments, the processor 310 may include one or more interfaces. For example, the processor 310 includes the universal serial bus (USB) interface 330, and the subscriber identification module (SIM) interface 395. For another example, the processor 310 may further include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, and/or the like.

It may be understood that an interface connection relationship between the modules shown in FIG. 3 is merely an example for description, and does not constitute a limitation on the mobile phone. In some other embodiments of this application, the mobile phone may also use an interface connection manner different from that shown in FIG. 3. For example, the modules are connected through a bus.

The charging management module 340 is configured to receive a charging input from the charger. The charger may be a wireless charger or a wired charger. In some embodiments of wired charging, the charging management module 340 may receive a charging input from the wired charger through the USB interface 330. In some embodiments of wireless charging, the charging management module 340 may receive a wireless charging input by using a wireless charging coil of the mobile phone. The charging management module 340 supplies power to the mobile phone by using the power management module 341 while charging the battery 342.

The power management module 341 is configured to connect the battery 342 and the charging management module 340 to the processor 310. The power management module 341 receives an input of the battery 342 and/or the charging management module 340, and supplies power to the processor 310, the internal memory 321, an external memory, the display 394, the camera 393, the wireless communications module 360, and the like. The power management module 341 may be configured to monitor parameters such as a battery capacity, a battery cycle count, and a battery state of health (electric leakage and impedance). In some other embodiments, the power management module 341 may alternatively be disposed in the processor 310. In some other embodiments, the power management module 341 and the charging management module 340 may alternatively be disposed in a same device.

A wireless communications function of the mobile phone may be implemented by using the antenna 1, the antenna 2, the mobile communications module 350, the wireless communications module 360, the modem processor, the baseband processor, and the like.

The antenna 1 and the antenna 2 are configured to transmit and receive an electromagnetic wave signal. Each antenna in the mobile phone may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 350 may provide a wireless communications solution that includes 2G/3G/4G/5G or the like and that is applied to the mobile phone. The mobile communications module 350 may include at least one filter, a switch, a power amplifier, a low noise amplifier (LNA), and the like.

The wireless communications module 360 may provide a wireless communications solution that is applied to the mobile phone and that includes a wireless local area network (WLAN) (for example, a Wi-Fi network), Bluetooth (BT), a global navigation satellite system (GNSS), frequency modulation (FM), near field communication (NFC), an infrared (IR) technology, or the like.

In some embodiments, the antenna 1 and the mobile communications module 350 in the mobile phone are coupled, and the antenna 2 and the wireless communications module 360 in the mobile phone are coupled, so that the mobile phone can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone implements a display function by using the GPU, the display 394, the application processor, and the like. The display 394 is configured to display an image, a video, or the like. The display 394 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the mobile phone may include one or N displays 394, where N is a positive integer greater than 1.

The mobile phone may implement a photographing function through the ISP, the camera 393, the video codec, the GPU, the display 394, the application processor, and the like. The camera 393 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV. In some embodiments, the mobile phone may include one or N cameras 393, where N is a positive integer greater than 1.

The external memory interface 320 may be configured to be connected to an external memory card, for example, a micro SD card, to extend a storage capability of the mobile phone. The external memory card communicates with the processor 310 through the external memory interface 320, to implement a data storage function. For example, files such as music and videos are stored in the external storage card.

The internal memory 321 includes a running memory and a built-in memory. The running memory may be configured to store a computer program and/or data, and the like. The processor 310 runs the computer program stored in the running memory, to perform various function applications of the mobile phone and process data. For example, the running memory may include a high-speed random access memory. The built-in memory may also be referred to as a built-in external memory or the like, and may be configured to store a computer program and/or data. For example, the built-in memory may store an operating system, an application, and the like. Usually, after the mobile phone loads the computer program and/or data in the built-in memory to the running memory, the processor 310 runs the corresponding computer program and/or data to implement a corresponding function. In addition, the internal memory 321 may include a non-volatile memory, for example, at least one magnetic disk storage device, a flash memory, and a universal flash storage (UFS).

The mobile phone may implement an audio function such as music playing or recording by using the audio module 370, the speaker 370A, the receiver 370B, the microphone 370C, the headset jack 370D, the application processor, and the like.

The button 390 includes a power button, a volume button, and the like. The button 390 may be a mechanical button, or may be a touch button. The mobile phone may receive a button input, and generate a button signal input related to a user setting and function control of the mobile phone.

The motor 391 may generate a vibration prompt. The motor 391 may be configured to provide an incoming call vibration prompt and a touch vibration feedback. For example, touch operations performed on different applications (for example, photographing and audio playback) may correspond to different vibration feedback effects. The motor 391 may also correspond to different vibration feedback effects for touch operations performed on different areas of the display 394. Different application scenarios (for example, time reminding, information receiving, an alarm clock, and a game) may also correspond to different vibration feedback effects. A touch vibration feedback effect may further be customized.

The indicator 392 may be an indicator light, may be configured to indicate a charging status and a power change, and may be configured to indicate a message, a missed call, a notification, and the like.

It may be understood that an illustrated structure in this embodiment of this application does not constitute a specific limitation on the mobile phone and ahead unit. In other embodiments of this application, the mobile phone and the head unit may include more or fewer components than those shown in the figure, or combine some components, or split some components, or have a different component arrangement. The components shown in the figure may be implemented by hardware, software, or a combination of software and hardware.

Figure 4:
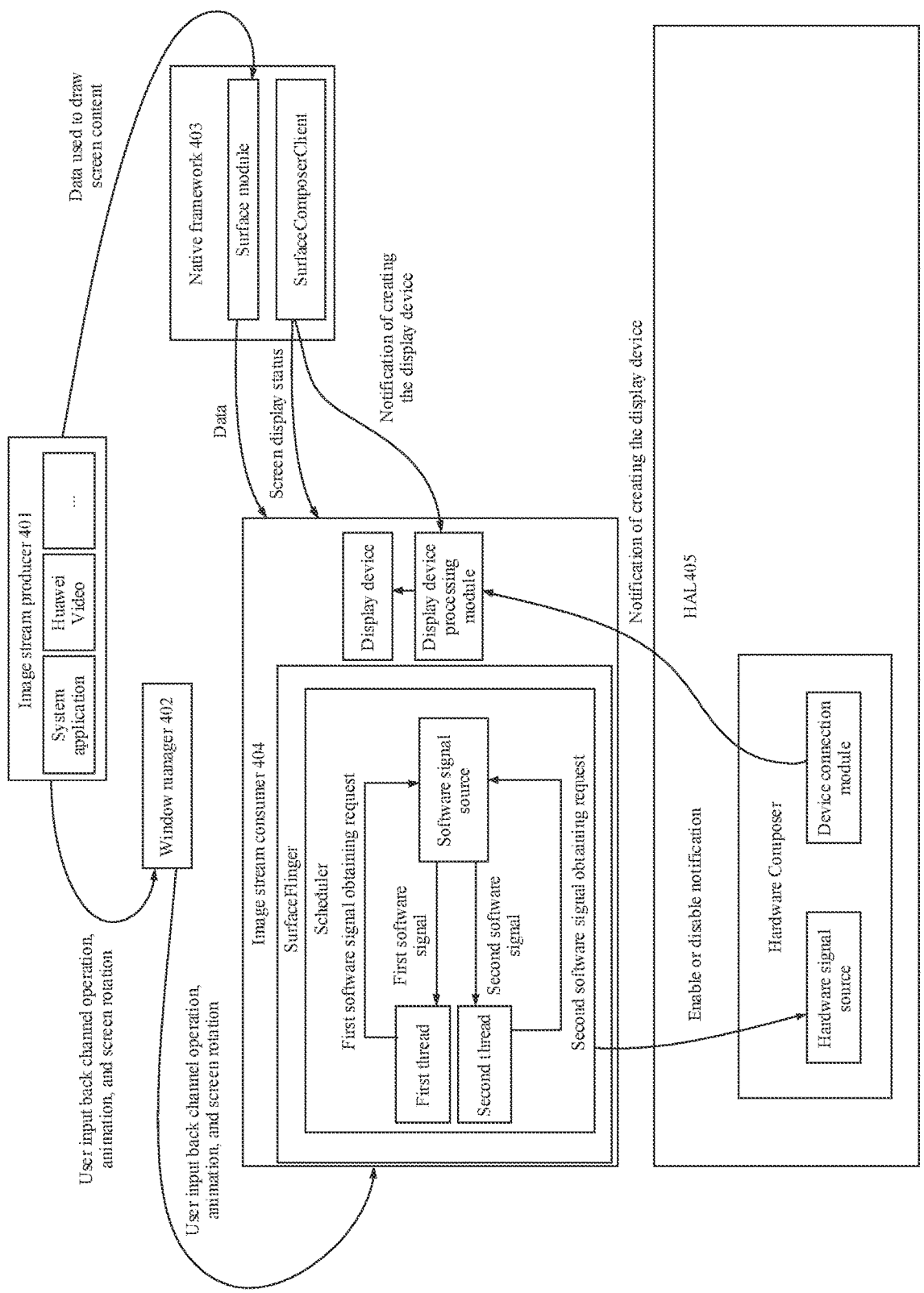
FIG. 4 is a schematic diagram of a software structure of a mobile phone according to an embodiment of this application.

For example, FIG. 4 is a schematic diagram of a software structure of a mobile phone according to an embodiment of this application. An image stream producer 401, a window manager 402, a native framework 403, an image stream consumer 404, and a hardware abstraction layer 405 are included.

The image stream producer 401 includes applications installed on the mobile phone, such as, an application (for example, a system application, Phone, Messaging, or Calendar) preconfigured on the mobile phone before delivery, and an application (for example, Huawei Video® or Huawei Music®) installed by a user according to a requirement of the user. For example, the image stream producer 401 triggers, by using a currently running application (for example, Huawei Video®), drawing and synthesizing of screen content that needs to be displayed. For example, when a user input back channel operation is received, and a type of projected screen content is animation and/or a screen of the mobile phone screen is rotated (Traversal) (for example, the screen of the mobile phone is rotated from a landscape mode to a portrait mode, or the screen of the mobile phone is rotated from a portrait mode to a landscape mode), the image stream producer 401 notifies the window manager 402 by using the currently running application, and sends, to the native framework 403, data (which may be referred to as buffer data) used to draw the screen content. For another example, when a screen display status of the mobile phone changes (for example, the screen display status of the mobile phone is switched from a screen-on state to a screen-off state, or the mobile phone is switched from a screen-off state to a screen-on state), the image stream producer 401 may further notify the native framework 403 of the screen display status of the mobile phone by using the system application. For another example, when the mobile phone serves as a source end device in a multi-screen collaboration scenario, the image stream producer 401 may further notify the native framework 403 by using the system application while screen content of the mobile phone is displayed on a target device in a form of a window.

The window manager 402 is configured to: after receiving a notification from the image stream producer 401, trigger or notify the image stream consumer 404 to draw and synthesize the screen content that needs to be displayed.

The native framework 403 includes a Surface module and a SurfaceComposerClient. For example, the native framework 403 sends, to the image stream consumer 404 by using the Surface module, the data used to draw the screen content. For another example, the native framework 403 notifies the image stream consumer 404 of the screen display status of the mobile phone by using the SurfaceComposerClient. For another example, the native framework 403 notifies the image stream consumer 404 of creating a display device (creatDisplay) by using the SurfaceComposerClient. It should be noted that the display device that is created and notified by the native framework 403 may be understood as a virtual display device.

The image stream consumer 404 includes a SurfaceFlinger. The SurfaceFlinger includes a Scheduler and a display device processing module (for example, the display device processing module may be an entry function processDisplayChangesLocked). For example, when the image stream consumer 404 receives, by using the display device processing module, a notification of creating a display device from the native framework 403 or the HAL 405, a corresponding display device is created, and when the created display device is used for multi-screen collaboration, a target counter is increased by 1. The target counter is configured to record a quantity of display devices that is of the mobile phone and that is connected for multi-screen collaboration.

For another example, the image stream consumer 404 receives the screen display status notified by the native framework 403, updates the screen display status of the mobile phone based on the foregoing screen display status, and records the screen display status. For example, if the native framework 403 notifies the image stream consumer 404 that the screen display status of the image stream consumer 404 is the screen-off state, the image stream consumer 404 turns off the screen of the mobile phone.

The Scheduler includes a first thread, a second thread, and a software signal source (for example, a DisplaySync module). The first thread is used for screen content drawing, and the second thread is used for screen content synthesis. The image stream consumer 404 receives a trigger of the window manager 402. When the screen display status of the mobile phone is the screen-off state, the first thread sends a first software signal obtaining request to the software signal source, and the second thread sends a second software signal obtaining request to the software signal source. In response to the first software signal obtaining request, the software signal source returns a first software signal to the first thread. In response to the second software signal obtaining request, the software signal source returns a second software signal to the second thread. The first software signal and the second software signal have a same cycle. It should be noted that the first software signal is used for screen content drawing synchronization, and may be understood as a drawing synchronization signal. The second software signal is used for screen content synthesis synchronization, and may be understood as a synthetic synchronization signal. Specifically, the first thread draws, based on the first software signal, the data that is used to draw the screen content and that is from the native framework 403, to obtain a screen content drawing result, and sends the screen content drawing result to the second thread. Then, the second thread correspondingly synthesizes the screen content drawing result based on the second software signal to obtain a screen content synthesis result, and sends the screen content synthesis result to the HAL 405.

It should be noted that the image stream consumer 404 receives the trigger of the window manager 402. If an electronic device is in the screen-off state, the image stream consumer 404 may not send a hardware signal source turn-off notification to the HAL 405, or may send a hardware signal source turn-off notification to the HAL 405. For example, when the electronic device is in the screen-off state, if the image stream consumer 404 does not send the hardware signal source turn-off notification to the HAL 405, the HAL 405 may keep the hardware signal source always in an on state. Further, in some embodiments, the image stream consumer 404 may send a hardware signal obtaining notification to the HAL 405 when deviations of two software signals generated by the software signal source are relatively large. If the deviations of the two software signals generated by the software signal source are restored to normal, a hardware signal obtaining stop notification may be sent to the HAL 405. Alternatively, when the hardware signal source is not turned off, the hardware signal source may cyclically generate a hardware signal and send the hardware signal to the image stream consumer 404, so that the image stream consumer 404 correspondingly adjusts, based on the hardware signal, the two software signals generated by the software signal source.

Further, in some embodiments, the image stream consumer 404 receives the trigger of the window manager 402. When the screen display status of the electronic device is the screen-off state and a count of the target counter is not 0, the first thread sends the first software signal obtaining request to the software signal source, and the second thread sends the second software obtaining request to the software signal source. When the count of the target technician is not 0, the mobile phone is in a multi-screen collaboration scenario.

The HAL 405 includes a Hardware Composer. The Hardware Composer includes the hardware signal source and a device connection module. The hardware signal source may be correspondingly turned on or off based on a turn-on or turn-off notification from the image stream consumer 404, or generate and send a hardware signal based on the hardware signal obtaining notification or the hardware signal obtaining stop notification from the image stream consumer 404. The device connection module may notify the image stream consumer 404 of creating a display device when a display device hot swap event is detected. It should be noted that the display device that is created and notified by the HAL 405 may be understood as a physical entity display device.

It should be understood that FIG. 4 is merely an example of a software architecture of the mobile phone, and does not constitute a limitation on the software architecture of the mobile phone. The mobile phone in this embodiment of this application may have more or fewer modules, or the like. The modules shown in FIG. 4 may be implemented in hardware, software, or a combination of hardware and software, including one or more signal processing and/or application-specific integrated circuits, or in a memory inside the mobile phone.

The following describes embodiments of this application in detail with reference to specific scenarios by using a mobile phone having the hardware structure shown in FIG. 3 and the software structure shown in FIG. 4 as an example.

Scenario 1: In a multi-screen collaboration scenario, the mobile phone is a source end device for multi-screen collaboration, and is configured to project screen content, a notebook computer is a target device for multi-screen collaboration, and is an electronic device to which the screen content is projected, and a connection used for multi-screen collaboration has been established between the mobile phone and the notebook computer, thereby implementing multi-screen collaboration.

Figure 5A:
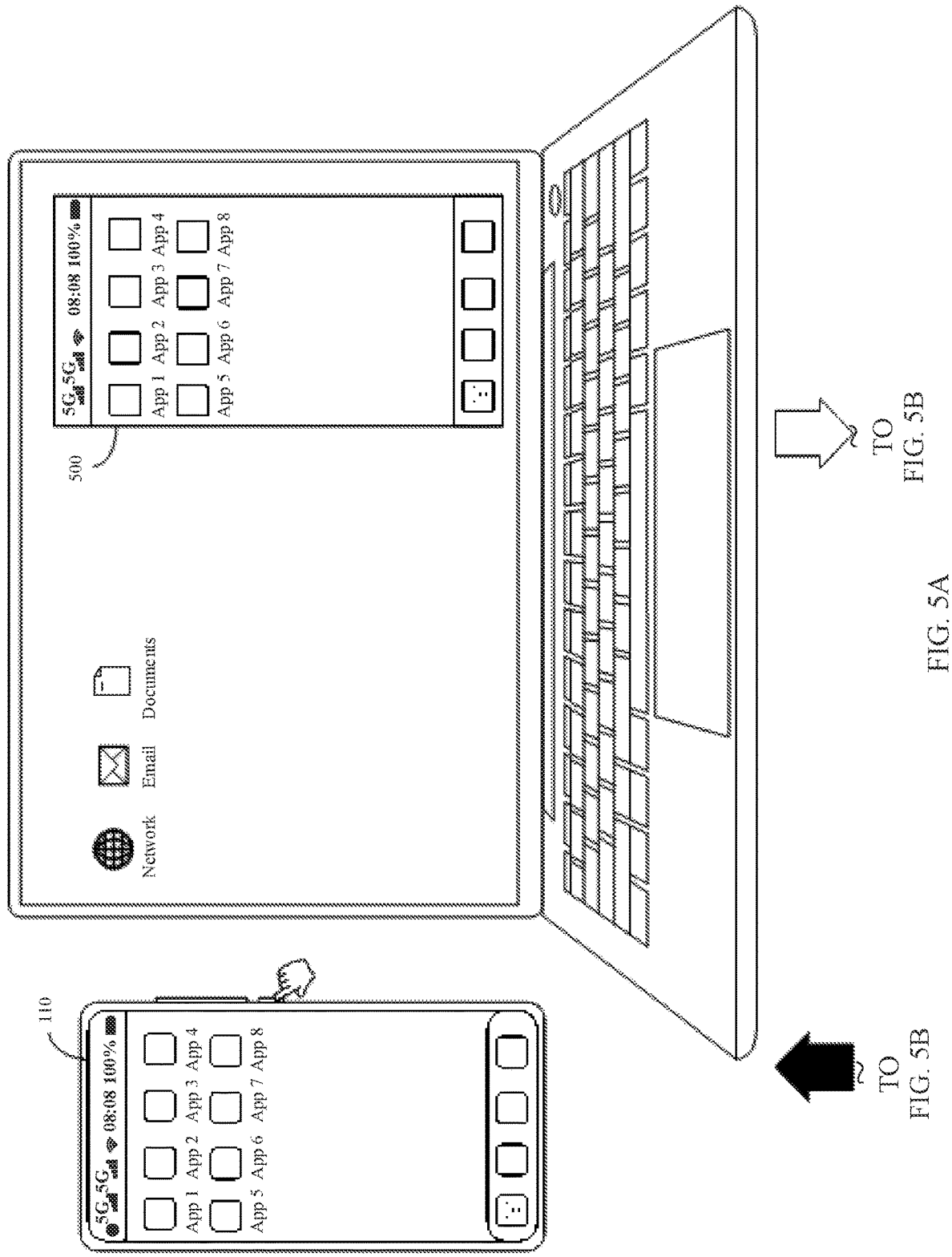

For example, as shown in FIG. 5A, when the mobile phone is in a screen-on state, the screen content projected to the notebook computer is the interface 110 of the mobile phone. The notebook computer displays the interface 110 in a window 500. After the mobile phone displays the interface 110 for a period of time in the screen-on state, the mobile phone automatically turns off a screen if no operation is performed on the mobile phone; or a user taps a power button of the mobile phone, so that the mobile phone turns off a screen in response to the fact that the user taps the power button of the mobile phone. In other words, the mobile phone switches from the screen-on state to a screen-off state, as shown in FIG. 5B. It should be noted that, after the screen of the mobile phone is turned off, if the user performs a user input back channel operation on the mobile phone in the window 500, the mobile phone does not turn on the screen in response to the user input back channel operation, and continues to be in the screen-off state. However, the mobile phone sends corresponding screen content to the notebook computer in response to the user input back channel operation, so that the notebook computer can update the screen content that is of the mobile phone and that is displayed in the window 500. When the mobile phone is in the screen-off state, the interface 110 may continue to be displayed in the window 500.

Figure 6:
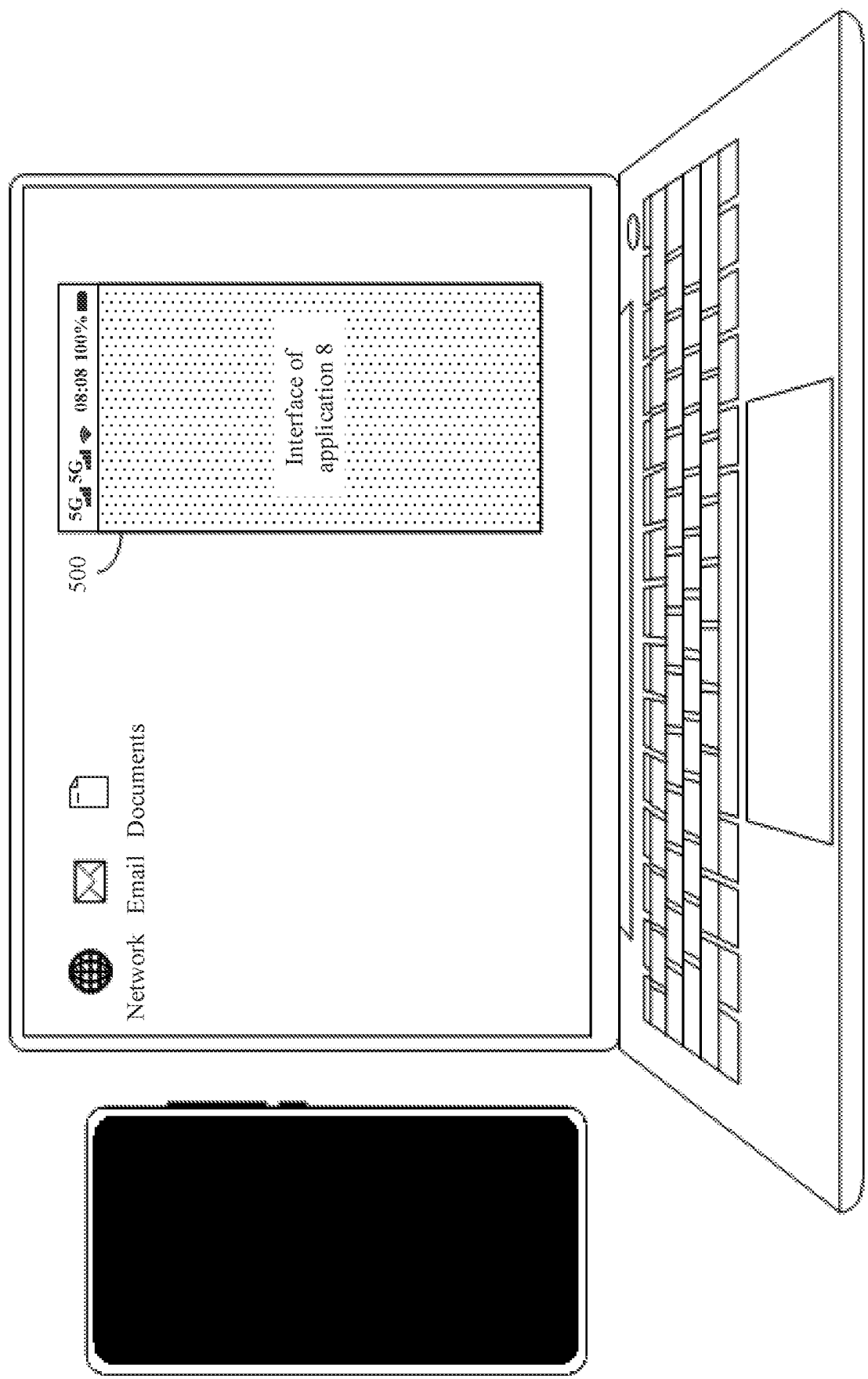
FIG. 6 is a schematic diagram of an interface according to an embodiment of this application.

In the foregoing scenario, in some embodiments, the mobile phone may turn off the hardware signal source in response to switching from the screen-on state to the screen-off state. Further, the mobile phone is in the screen-off state, and the interface 110 is displayed in the window 500. If the notebook computer receives an event generated when the user taps an icon of an application 8 in the interface 110, the notebook computer notifies the mobile phone of the event. The mobile phone receives the event generated when the user taps the icon of the application 8 in the interface 110, draws screen content based on a first software signal to obtain a screen content drawing result, and then synthesizes the screen content drawing result based on a second software signal to obtain a screen content synthesis result. Then, the mobile phone sends the screen content synthesis result to the notebook computer, so that the notebook computer performs corresponding display in the window 500 based on the screen content synthesis result. For example, as shown in FIG. 6, an interface of the application 8 is displayed in the window 500, and the mobile phone continues to be in the screen-off state. The first software signal and the second software signal have a same cycle, and are generated by a same software signal source. A phase of the first software signal may be the same as or different from a phase of the second software signal, which is not limited herein. For example, the software signal source performs phase adjustment on one software signal to obtain the first software signal and the second software signal.

Alternatively, in the foregoing scenario, in some other embodiments, the mobile phone may continue to keep the hardware signal source in an on state in response to switching from the screen-on state to the screen-off state, and a solution used when the mobile phone is in the screen-on state is still used. This solution may be applied to a scenario in which power consumption is insensitive, for example, the mobile phone has a relatively large remaining power, or a performance mode is in an on state. The performance mode may be understood as a mode in which the power consumption of the mobile phone is low.

For example, the mobile phone is in the screen-off state, and the interface 110 is displayed in the window 500. If the notebook computer receives an event generated when the user taps an icon of an application 8 in the interface 110, the notebook computer notifies the mobile phone of the event. The mobile phone receives the event generated when the user taps the icon of the application 8 in the interface 110, draws screen content based on a first software signal to obtain a screen content drawing result, and then synthesizes the screen content drawing result based on a second software signal to obtain a screen content synthesis result. Then, the mobile phone sends the screen content synthesis result to the notebook computer, so that the notebook computer performs corresponding display in the window 500 based on the screen content synthesis result. For example, as shown in FIG. 6, an interface of the application 8 is displayed in the window 500, and the mobile phone continues to be in the screen-off state. The first software signal and the second software signal have a same cycle, and are generated by a same software signal source. A phase of the first software signal may be the same as or different from a phase of the second software signal, which is not limited herein. In this case, because the hardware signal source is in the on state, the hardware signal source may generate a hardware signal when a difference between a cycle of the first software signal and an expected value and a difference between a cycle of the second software signal and an expected value are greater than or equal to a threshold, and adjust the cycles of the first software signal and the second software signal that are generated by the software signal source, so that a difference between a cycle of the first software signal and the expected value and a difference between a cycle of the second software signal and the expected value are within a threshold range. This helps reduce a display exception that is of the screen content in the window 500 and that affects viewing of the user.

Scenario 2: As shown in FIG. 6, the mobile phone is in a screen-off state, and a notebook computer displays an interface of an application 8 in the window 500. The interface of the application 8 is projected by the mobile phone to the notebook computer in a multi-screen collaboration scenario. When the interface of the application 8 is a video playback interface, if a video on the interface of the application 8 is in a playing state, even if a user does not use the notebook computer to perform a user input back channel operation on the mobile phone, the notebook computer notifies the mobile phone of an event generated when a type of content on the interface of the application 8 includes an animation. In this case, the mobile phone receives the event generated when the type of content on the interface of the application 8 includes the animation, and a screen content synthesis result may also be obtained by using the solution in scenario 1, to be sent to the notebook computer. It should be noted that, when the video is played in the window 500, if the user does not operate the mobile phone, the mobile phone continues to be in the screen-off state.

Scenario 3: As shown in FIG. 7A, the mobile phone is in a screen-off state, and a notebook computer displays an interface of an application 8 in the window 500. The interface of the application 8 is projected by the mobile phone to the notebook computer in a multi-screen collaboration scenario. When a type of content on the interface of the application 8 does not include an animation, if a user rotates a screen of the mobile phone from a portrait mode to a landscape mode, as shown in FIG. 7B, the mobile phone may also obtain a screen content synthesis result by using the solution in scenario 1 in response to an event generated when the screen of the mobile phone is rotated from the portrait mode to the landscape mode, and send the screen content synthesis result to the notebook computer. In this case, according to the screen content synthesis result, the notebook computer also correspondingly adjusts the window 500 to a window 500', and performs corresponding display in the window 500'. It should be noted that, when a video is played in the window 500, if the user does not operate the mobile phone, the mobile phone continues to be in the screen-off state. It should be noted that, rotation of the screen of the mobile phone from the landscape mode to the portrait mode is similar to rotation of the screen of the mobile phone from the portrait mode to the landscape mode, and details are not described herein again.

Figure 8A:
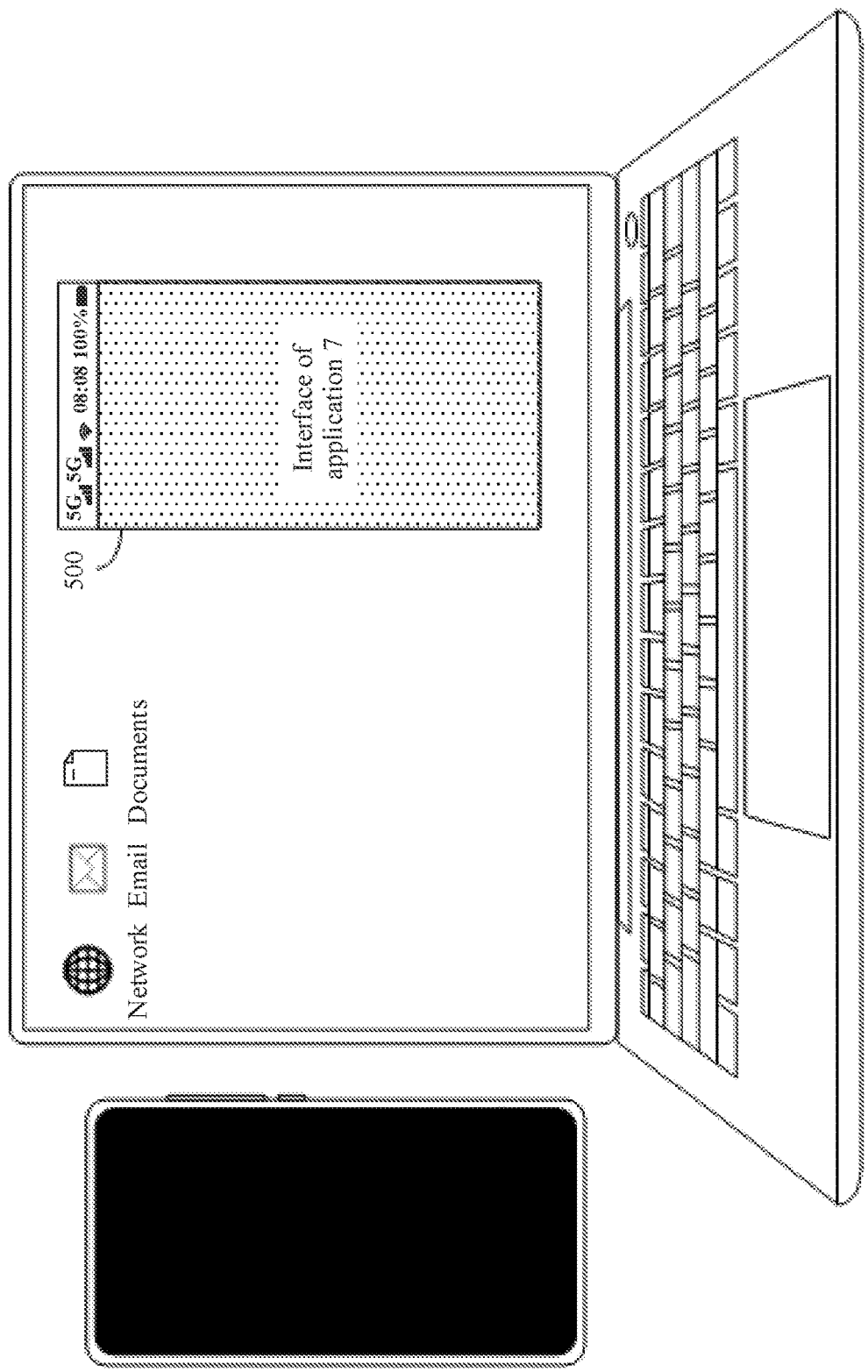

In addition, it should be further noted that, when the screen of the mobile phone is rotated from the landscape mode to the portrait mode or from the portrait mode to the landscape mode, if screen content projected by the mobile phone to the notebook computer does not change, the mobile phone does not need to perform a screen content synthesis process. For example, an application 7 is used as an example, and an interface of the application 7 does not change when the screen of the mobile phone is in the landscape mode and the portrait mode. For example, as shown in FIG. 8A and FIG. 8B, the user rotates the screen of the mobile phone from the portrait mode to the landscape mode, and content displayed in the window 500 of the notebook computer remains unchanged.

Scenario 4: FIG. 5A and FIG. 5B are used as an example. As shown in FIG. 5B, the mobile phone is in a screen-off state, and the notebook computer displays the interface 110 in the window 500. The interface 110 is projected by the mobile phone to the notebook computer in a multi-screen collaboration scenario. If a user presses a power button, the mobile phone turns on a screen in response to the fact that the user presses the power button, as shown in FIG. 5A. When the mobile phone is in the screen-off state, if a hardware signal source is turned off, the mobile phone turns on the hardware signal source in response to turning on the screen. In some embodiments, when the mobile phone is in the screen-off state, if the hardware signal source is turned on, the mobile phone continues to keep the hardware signal source in an on state in response to turning on the screen. When the mobile phone is in a screen-on state, the mobile phone may obtain a screen content synthesis result by using the technical solution in the screen-on state, and details are not described herein.

Figure 9:
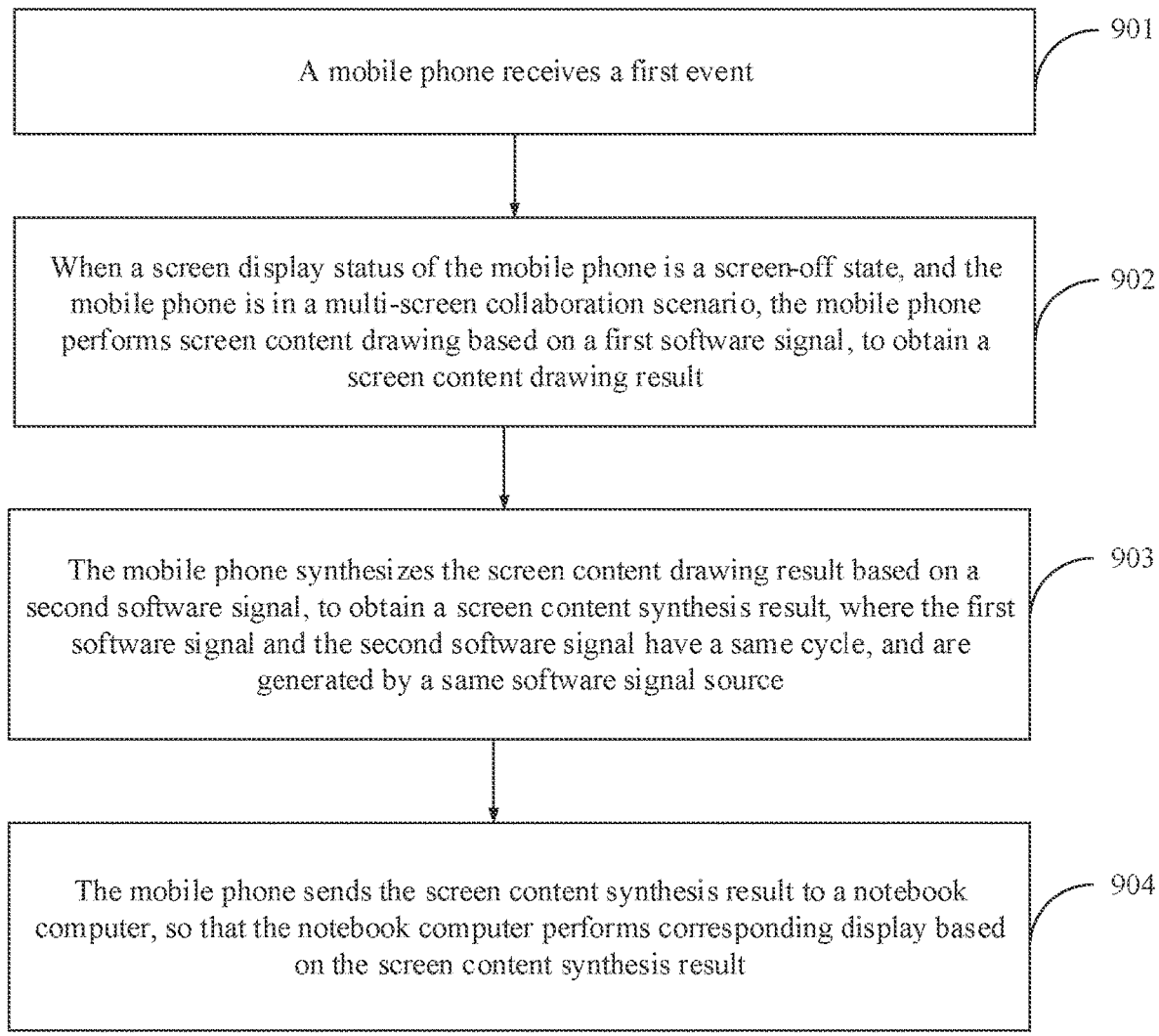
FIG. 9 is a schematic flowchart of a display method according to an embodiment of this application.

Based on the foregoing embodiments, an example in which the hardware signal source is turned off when the mobile phone is in the screen-off state is used. FIG. 9 is a schematic flowchart of a display method according to an embodiment of this application. The method specifically includes the following steps.

901: The mobile phone receives a first event. The first event is used to trigger drawing and synthesis of screen content that needs to be displayed. For example, in a multi-screen system scenario, the mobile phone is a source end device for multi-screen collaboration and is configured to project the screen content, and the notebook computer is a target device for multi-screen collaboration and is an electronic device to which the screen content is projected. In this case, the first event may be an event generated when the user performs, on the notebook computer in the multi-screen collaboration scenario, a user input back channel operation on the mobile phone, or may be an event generated when a type of the screen content projected by the mobile phone to the notebook computer is an animation, or may be an event generated when the user rotates the screen of the mobile phone, for example, an event generated when the screen of the mobile phone is rotated from the landscape mode to the portrait mode, or an event generated when the screen of the mobile phone is switched from the portrait mode to the landscape mode.

902: When a screen display status of the mobile phone is a screen-off state, and the mobile phone is in the multi-screen collaboration scenario, the mobile phone performs screen content drawing based on a first software signal, to obtain a screen content drawing result.

For example, the mobile phone may determine, based on a quantity recorded by a target counter, whether the mobile phone is in the multi-screen collaboration scenario. The target counter is configured to record a quantity of display devices that perform multi-screen collaboration with the mobile phone. For example, when the quantity recorded by the target counter is not 0, the mobile phone determines that the mobile phone is currently in the multi-screen collaboration scenario. For another example, when the quantity recorded by the target counter is 0, the mobile phone determines that the mobile phone is not currently in the multi-screen collaboration scenario.

903: The mobile phone synthesizes the screen content drawing result based on a second software signal, to obtain a screen content synthesis result. The first software signal and the second software signal have a same cycle, and are generated by a same software signal source.

It should be noted that a phase of the first software signal and a phase of the second software signal may be the same or different. This is not limited herein.

904: The mobile phone sends the screen content synthesis result to the notebook computer, so that the notebook computer performs corresponding display based on the screen content synthesis result.

Further, in some embodiments, if the mobile phone receives a screen-on operation, the mobile phone turns on the hardware signal source in response to the screen-on operation.

When the mobile phone is in the screen-off state, if the hardware signal source is kept in the on state, and the mobile phone receives the first event, for responding to the first event, refer to the method shown in FIG. 9. However, different from the method shown in FIG. 9, when the mobile phone is in the screen-off state, if the hardware signal source is kept in the on state, the mobile phone may adjust, based on the hardware signal generated by the hardware signal source, cycles of two software signals generated by the software signal source. This helps reduce a possibility of a screen display exception.

It should be noted that, in this embodiment of this application, step 902 in the method shown in FIG. 9 may alternatively be replaced with: When a screen display status of the mobile phone is a screen-off state, screen content drawing is performed based on a first software signal, so that a screen content drawing result is obtained. Then, step 903 and step 904 are performed.

In addition, the foregoing performs description by using the multi-screen collaboration scenario of the mobile phone and the notebook computer as an example. This is not limited in this embodiment of this application.

Figure 10:
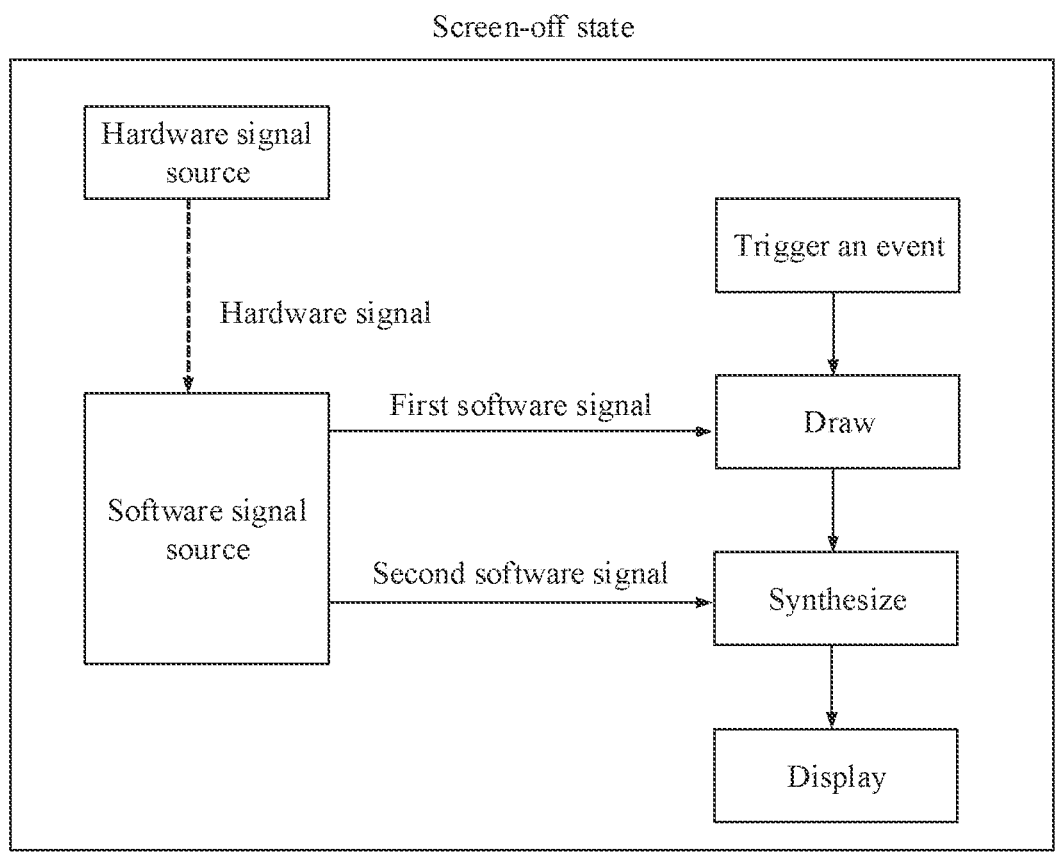
FIG. 10 is a schematic diagram of a drawing and synthesizing interface according to an embodiment of this application.

In addition, in some embodiments, when the mobile phone is in the screen-off state, if a specific application (where the specific application is, for example, a music application, continuing to perform interface drawing and synthesis in the screen-off state, and a first application is used as an example) is run, the mobile phone may respond to an event that triggers drawing and synthesis of an interface of the first application. The mobile phone draws the interface of the first application based on a first software signal to obtain an interface drawing result, and then synthesizes the interface drawing result of the first application based on a second software signal. As shown in FIG. 10, the first software signal and the second software signal are software synchronization signals that are generated by a same software signal source in the mobile phone and that have a same cycle. When the mobile phone is in the screen-off state, the hardware signal source may be turned off or turned on. For example, when the hardware signal source is in the on state, the hardware signal source may generate a hardware signal when a difference between a cycle of the first software signal and an expected value and a difference between a cycle of the second software signal and an expected value are greater than or equal to a threshold, and adjust the cycles of the first software signal and the second software signal that are generated by the software signal source, so that a difference between a cycle of the first software signal and the expected value and a difference between a cycle of the second software signal and the expected value are within a threshold range. This helps reduce a frame loss rate and improving user experience.

The foregoing embodiments may be used in combination with each other, or may be used separately. This is not limited herein.

Figure 11:
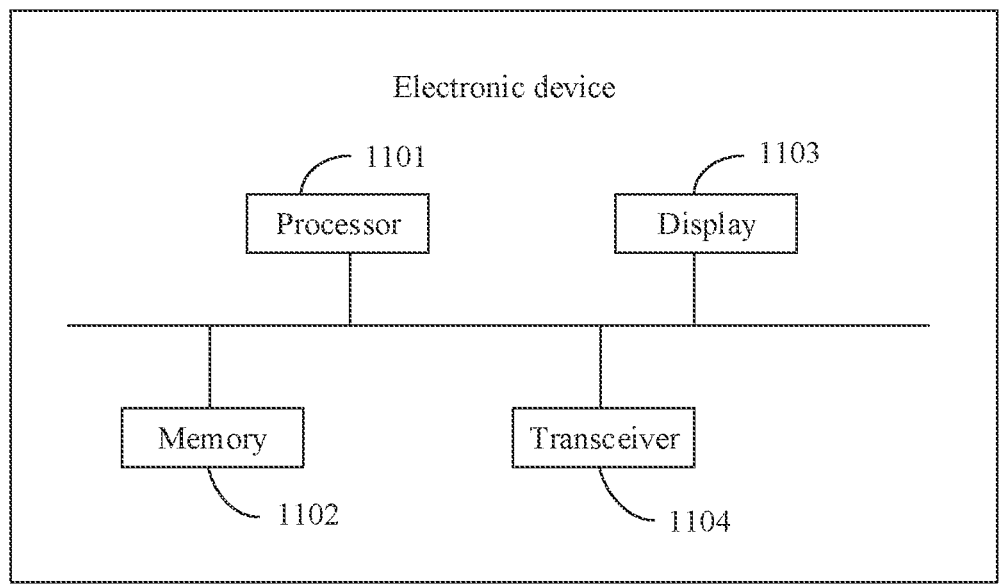
FIG. 11 is a schematic diagram of a structure of an electronic device according to an embodiment of this application.

Based on a same concept, an embodiment of this application further provides an electronic device, as shown in FIG. 11, including a processor 1101, a memory 1102, a transceiver 1104, and a display 1103. For example, the foregoing components may be connected through one or more communications buses. The one or more computer programs are stored in the memory 1102 and are executed, through configuration, by the processor 1101. The one or more computer programs include instructions, and the instructions may be used to enable the electronic device to perform the steps of the method in the foregoing embodiments.

For example, the processor 1101 may be specifically the processor 310 shown in FIG. 3, the memory 1102 may be specifically the internal memory 321 shown in FIG. 3 and/or the external memory connected to the electronic device, the transceiver 1104 may be the mobile communications module 350 and/or the wireless communications module 360 shown in FIG. 3, and the display 1103 may be specifically the display 394 shown in FIG. 3. This is not limited in this embodiment of this application.

In addition, an embodiment of this application further provides a graphical user interface (GUI) on an electronic device. The graphical user interface specifically includes a graphical user interface displayed when the electronic device performs the foregoing method embodiments.

According to the context, the term "when" or "after" used in the foregoing embodiments may be interpreted as a meaning of "if", "after", "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

All or a part of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like. In a case in which no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Patent Office.

What is claimed is:

1. A method, wherein the method comprises:
    establishing, by a first device, a connection for multi-screen collaboration to a second device;
    receiving, by the first device, a first event, wherein the first event triggers the first device to turn off a screen;
    turning off, by the first device, the screen in response to the first event;
    receiving, by the first device, a second event, wherein the second event triggers drawing and synthesis of screen content of the first device to be displayed on the second device;
    drawing, by the first device, the screen content based on a first software signal in response to the second event, to obtain a screen content drawing result;
    synthesizing, by the first device, the screen content drawing result based on a second software signal, to obtain a screen content synthesis result, wherein the first software signal and the second software signal are software synchronization signals that are generated by a same software signal source in the first device and that have a same cycle;
    sending, by the first device, the screen content synthesis result to the second device; and
    after turning off the screen, turning off, by the first device, a hardware signal source, wherein the hardware signal source generates a hardware signal for adjusting a cycle of the first software signal and a cycle of the second software signal.

2. The method according to claim 1, wherein the second event is an event generated by a user input back channel operation performed on the first device by a user on the second device;
    the second event is an event generated in response to at least that a type of the screen content of the first device to be displayed on the second device is an animation; or
    the second event is an event generated by an operation of rotating the screen of the first device from a landscape mode to a portrait mode by a user, or an event generated by an operation of rotating the screen of the first device from a portrait mode to a landscape mode by a user.

3. The method according to claim 1, wherein after the turning off, by the first device, the screen, the method further comprises:
    keeping, by the first device, a hardware signal source in an on state.

4. The method according to claim 3, wherein the method further comprises:
    in response to at least one of the following: a difference between a cycle of the first software signal and an expected value is greater than or equal to a first threshold, and a difference between a cycle of the second software signal and the expected value is greater than or equal to the first threshold, generating, by the first device, a hardware signal by using the hardware signal source, and adjusting at least one of the cycle of the first software signal and the cycle of the second software signal based on the hardware signal, so that a difference between either the cycle of the first software signal or the cycle of the second software signal and the expected value is less than the first threshold.

5. The method according to claim 1, wherein after the receiving, by the first device, a second event, and before the drawing, by the first device, the screen content based on a first software signal, the method further comprises:
    determining, by the first device, that the first device is currently in a screen-off state and that the first device is in a multi-screen collaboration scenario.

6. The method according to claim 1, wherein the method further comprises:
    in response to at least that a target counter is not 0, determining, by the first device, that the first device is in a multi-screen collaboration scenario.

7. The method according to claim 1, wherein the first software signal is a drawing synchronization signal, and the second software signal is a synthetic synchronization signal.

8. An electronic device, comprising at least one processor, at least one memory coupled to the at least one processor, a display, and a transceiver, wherein the at least one memory stores programming instructions for execution by the at least one processor to cause the electronic device to perform operations comprising:
    establishing, with a second device, a connection for multi-screen collaboration;
    receiving a first event, wherein the first event triggers the electronic device to turn off a screen;
    turning off the screen in response to the first event;

receiving a second event, wherein the second event triggers drawing and synthesis of screen content of the electronic device to be displayed on the second device;

drawing the screen content based on a first software signal in response to the second event, to obtain a screen content drawing result;

synthesizing the screen content drawing result based on a second software signal, to obtain a screen content synthesis result, wherein the first software signal and the second software signal are software synchronization signals that are generated by a same software signal source in the electronic device and that have a same cycle;

sending the screen content synthesis result to the second device; and after turning off the screen, turning off a hardware signal source, wherein the hardware signal source generates a hardware signal for adjusting a cycle of the first software signal and a cycle of the second software signal.

9. The electronic device according to claim 8, wherein the second event is an event generated by a user input back channel operation performed on the electronic device by a user on the second device;

the second event is an event generated in response to at least that a type of the screen content of the electronic device to be displayed on the second device is an animation; or the second event is an event generated by an operation of rotating the display of the electronic device from a landscape mode to a portrait mode by a user, or an event generated by an operation of rotating the display of the electronic device from a portrait mode to a landscape mode by a user.

10. The electronic device according to claim 8, wherein after the electronic device turns off the screen, the operations further comprise:

keeping a hardware signal source in an on state.

11. The electronic device according to claim 10, wherein the operations further comprise:

in response to at least one of the following: a difference between a cycle of the first software signal and an expected value is greater than or equal to a first threshold, and a difference between a cycle of the second software signal and the expected value is greater than or equal to the first threshold, generating a hardware signal by using the hardware signal source, and adjusting at least one of the cycle of the first software signal and the cycle of the second software signal based on the hardware signal, so that a difference between either the cycle of the first software signal or the cycle of the second software signal and the expected value is less than the first threshold.

12. The electronic device according to claim 8, wherein after the electronic device receives the second event and before the electronic device draws the screen content based on the first software signal, the operations further comprise:

determining that the electronic device is currently in a screen-off state and that the electronic device is in a multi-screen collaboration scenario.

13. The electronic device according to claim 8, wherein the operations further comprise:

in response to at least that a target counter is not 0, determining that the electronic device is in a multi-screen collaboration scenario.

14. The electronic device according to claim 8, wherein the first software signal is a drawing synchronization signal, and the second software signal is a synthetic synchronization signal.

15. A non-transitory computer-readable storage medium comprising programming instructions for execution by at least one processor of an electronic device to cause the electronic device to perform operations comprising:

establishing, with a second device, a connection for multi-screen collaboration;

receiving a first event, wherein the first event triggers the electronic device to turn off a screen;

turning off the screen in response to the first event;

receiving a second event, wherein the second event triggers drawing and synthesis of screen content of the electronic device to be displayed on the second device;

drawing the screen content based on a first software signal in response to the second event, to obtain a screen content drawing result;

synthesizing the screen content drawing result based on a second software signal, to obtain a screen content synthesis result, wherein the first software signal and the second software signal are software synchronization signals that are generated by a same software signal source in the electronic device and that have a same cycle;

sending the screen content synthesis result to the second device; and after turning off the screen, turning off a hardware signal source, wherein the hardware signal source generates a hardware signal for adjusting a cycle of the first software signal and a cycle of the second software signal.

16. The non-transitory computer-readable storage medium according to claim 15, wherein the second event is an event generated by a user input back channel operation performed on the electronic device by a user on the second device;

the second event is an event generated in response to at least that a type of the screen content of the electronic device to be displayed on the second device is an animation; or the second event is an event generated by an operation of rotating the display of the electronic device from a landscape mode to a portrait mode by a user, or an event generated by an operation of rotating the display of the electronic device from a portrait mode to a landscape mode by a user.

17. The non-transitory computer-readable storage medium according to claim 15, wherein after the electronic device turns off the screen, the operations further comprise:

keeping a hardware signal source in an on state.

18. The non-transitory computer-readable storage medium according to claim 17, wherein the operations further comprise:

in response to at least one of the following: a difference between a cycle of the first software signal and an expected value is greater than or equal to a first threshold, and a difference between a cycle of the second software signal and the expected value is greater than or equal to the first threshold, generating a hardware signal by using the hardware signal source, and adjusting at least one of the cycle of the first software signal and the cycle of the second software signal based on the hardware signal, so that a difference between either the cycle of the first software signal or the cycle of the second software signal and the expected value is less than the first threshold.

19. The non-transitory computer-readable storage medium according to claim 15, wherein after the electronic device receives the second event and before the electronic device draws the screen content based on the first software signal, the operations further comprise:
determining that the electronic device is currently in a screen-off state and that the electronic device is in a multi-screen collaboration scenario.

20. The non-transitory computer-readable storage medium according to claim 15, wherein the first software signal is a drawing synchronization signal, and the second software signal is a synthetic synchronization signal.

\* \* \* \* \*